(12) United States Patent
Symonds

(10) Patent No.: US 7,258,844 B1
(45) Date of Patent: Aug. 21, 2007

(54) HEAT EXCHANGER

(75) Inventor: Keith Thomas Symonds, Staffs (GB)

(73) Assignee: Chart Industries, Inc., Garfield Heights, OH (US)

( * ) Notice: Subject to any disclaimer, the term of this patent is extended or adjusted under 35 U.S.C. 154(b) by 519 days.

(21) Appl. No.: 10/129,764

(22) PCT Filed: Oct. 24, 2000

(86) PCT No.: PCT/GB00/04104

§ 371 (c)(1),
(2), (4) Date: May 8, 2002

(87) PCT Pub. No.: WO01/35043

PCT Pub. Date: May 17, 2001

(30) Foreign Application Priority Data

Nov. 10, 1999 (GB) .................................. 9926466.5

(51) Int. Cl.
*F28D 9/00* (2006.01)
*B01J 8/02* (2006.01)
*B01J 19/24* (2006.01)

(52) U.S. Cl. ........................ 422/198; 422/211; 165/165

(58) Field of Classification Search ................ 422/198, 422/200, 190, 211; 165/167, DIG. 356, DIG. 357, 165/DIG. 358, DIG. 360, DIG. 361, DIG. 363, 165/DIG. 364; *F28F 3/00; F28D 9/00*
See application file for complete search history.

(56) References Cited

FOREIGN PATENT DOCUMENTS

| EP | 563951 A2 * | 10/1993 |
|---|---|---|
| EP | 0 571 881 A | 12/1993 |
| GB | 1 558 994 A | 1/1980 |
| WO | WO98 55812 A | 12/1998 |

\* cited by examiner

*Primary Examiner*—Glenn Caldarola
*Assistant Examiner*—Jennifer A. Leung
(74) *Attorney, Agent, or Firm*—DLA Piper US LLP

(57) ABSTRACT

A stacked assembly of plates is provided, a first portion of the length of the assembly being formed of one or more first perforated plates, with a central open region enclosed by inner annulus and limbs from the outer diameter of the inner annulus to the inner diameter of an outer peripheral annulus, whereby the first plate has a central passageway for the first fluid inside the inner annulus and a plurality of outer frusto-annular passageways for the second fluid, and, at one end of the first portion, a second portion of the length of the assembly formed of one or more second perforated plates of similar construction to the first plates, each second plate differing from the first plate in that its outer peripheral annulus has one or more discontinuities to provide an inlet or an outlet into the outer frusto-annular passageways of the second portion.

26 Claims, 26 Drawing Sheets

HEAT EXCHANGER

FIELD OF THE INVENTION

This invention relates to heat exchangers. It is particularly concerned to provide a heat exchanger that can be used with a particulate fluid, i.e. wherein one of the fluids passing through the heat exchanger comprises granules or powder constituents. Heat exchangers for particulate fluids are known generally as "bulk fluid" heat exchangers.

It will be appreciated that the present invention is not intended to be limited to bulk fluid heat exchangers and the structures of the invention may equally, if desired, be used to exchange heat between two liquids, two gases or between a gas and a liquid. As a specific further example only, they may also be used as packed bed catalytic reactors. They may also be used in so-called heat recuperation applications, e.g. in the recovery of heat from flue gases, which heat may then be used for other purposes. Nevertheless, background to the invention will, for convenience, now be described with particular reference to bulk fluid heat exchangers.

BACKGROUND OF THE INVENTION

Conventionally, particulate streams that need to be heated or cooled are passed through rotating drums, over fluidised beds or along passageways defined between rows of parallel spaced plates. The plates, which are conveniently hung vertically, are hollow and coolant or heating fluid is passed through the interior of the plates. The particulate streams may pass vertically downwardly in their passageways and the coolant or heating fluid may pass upwardly through the plates. Heat exchange takes place through the surfaces of the plates which define the passageway walls. The distance between the plates, i.e. the passageways, may be varied depending on the type and size of the particulates to be processed.

The heat transfer efficiency in such plate-type bulk fluid heat exchangers, although improved over other known types, is limited if gases are used for heating or cooling. The plates are usually of stainless steel, dimpled and spot welded together via the dimples. The plates cannot withstand high internal pressures so that flow-through rates must be kept low, resulting in poor heat transfer depending on the characteristics of the heating or cooling medium. Thus these heat exchangers are essentially only suitable for heating or cooling by means of a liquid as a consequence of the high thermal capacity of liquids relative to gases. Liquids, however, have a limited operating temperature range in comparison with gases.

SUMMARY OF THE INVENTION

It is, therefore, an object of the invention to provide an improved structure that can be used, inter alia, as a bulk fluid heat exchanger with improved heat exchange properties, preferably with gas heating or cooling but also, if desired, with liquid heating or cooling.

Accordingly the invention provides a stacked assembly of plates, the stack having an inlet and an outlet for a first fluid and an inlet and an outlet for a second fluid, a first portion of the length of the assembly being formed of one or more first perforated plates, each first plate being perforated to define a central open region enclosed by an inner annulus and limbs from the outer diameter of the inner annulus to the inner diameter of an outer peripheral annulus, whereby the first plate has a central passageway for the first fluid inside the inner annulus and a plurality of outer frusto-annular passageways for the second fluid, the outer passageways being defined between the inner and outer annuli and the limbs, the central passageway being connected to said inlet and outlet for the first fluid, and, at one end of the first portion, a second portion of the length of the assembly being formed of one or more second perforated plates of similar construction to the first plates so as to provide inner and outer passageways in line with the inner and outer passageways of the first portion of the assembly, each second plate differing from the first plate in that its outer peripheral annulus has one or more discontinuities to provide an inlet or an outlet into the outer frusto-annular passageways of the second portion, the plate(s) of each portion assembling in the stack to provide a continuous central passageway for the first fluid and continuous outer frusto-annular passageways for the second fluid.

Preferably, the assembly has a third portion of its length formed at the other end of the first portion, the plate(s) of the third portion being of the same construction as the plate(s) of the second portion, whereby the discontinuity or discontinuities provide an outlet or an inlet from the outer frusto-annular passageways of the third portion.

The plates may be discs, i.e. they may be circular in plan, but this is not essential. For many applications it may be preferable to use plates of square or rectangular plan configuration.

In a preferred embodiment, the first and second plates are perforated so that their central passageways are formed as a plurality of separate passageways.

Thus in one particularly preferred embodiment, the plates are discs and the first and second discs are perforated so that each defines a hub at the centre of its central passageway with a plurality of spokes radiating outwardly from the hub to connect with the inner annulus. Each spoke may correspond to a limb between the inner and outer annuli so that each limb is in effect a continuation of each spoke. However, this is not essential so that, for example, in a specific, non-limiting configuration there may be eight equi-spaced spokes but only four limbs so that only alternate spokes have a corresponding limb. Indeed, it is not essential that the limbs correspond with any spokes; each limb may instead be positioned to lie between the outer ends of a pair of adjacent spokes.

As in this preferred embodiment the spokes divide the central longitudinal passageway through the stack into a plurality of passageways, heat exchange between first and second fluids passing through the stack is thereby assisted by conduction through the spokes. Similarly where the plates are square or rectangular in plan, their central passageways may be formed as a plurality of separate passageways by providing an appropriate array of apertures inside the inner annulus.

These arrangements are particularly useful as a bulk fluid heat exchanger in which the first fluid is the particulate medium, i.e. which passes through the central passageways. Variants of this embodiment may also be useful as packed bed catalytic reactors.

In another embodiment, the limbs and/or spokes and/or hubs may be hollow so that fluid may also flow through passageways defined by stacks of these adjacent components.

The embodiments defining a plurality of central passageways have the particular advantage in that they provide an increased surface area for heat transfer, i.e. an extended wetted perimeter, for a given bulk flow cross-sectional area.

The discontinuities in the outer peripheral annulus of the second plates may simply be provided by a gaps or breaks in the annulus. Alternatively, they may be in the form of a loop in the circumference extending outwardly beyond the perimeter of the annulus. Loops stacked together in a stack of plates can thereby form inlet and outlet tanks fed from or feeding to an appropriate source or destination.

In another preferred embodiment of the invention the assembly of plates also includes at one or each end thereof one or more third perforated plates. Each third plate may have a central open region identical to that of the first plates. However, instead of an inner and outer peripheral annulus with limbs defining the outer frusto-annular passageways of the first plate(s), the third plates have a solid annular peripheral region of radial extent to cover the outer frusto-annular passageways of the first plate(s) or second plate(s). Thus when positioned at an end of the assembly in contact with the sole or outermost second plate, the third plate blocks the outer frusto-annular passageways so that flow therethrough is via their discontinuities only, i.e. via the inlet and/or outlet provided to the frusto-annular outer passageways.

Conveniently all the plates may be of the same overall diameter so that they can be readily assembled together to provide the desired passageways through the assembly.

The plates may conveniently all be of the same thickness, e.g. from 1 mm to 12 mm. However, this is not essential and it may be found advantageous in particular circumstances to use plates of different thickness in the assembly.

The plates may be brazed or bonded together to form the stack. For example, the plates may be of clad aluminium or of stainless steel. The required perforations may be cut, for example, by high pressure water jet or by etching, blanking or laser cutting. The perforated discs can then be vacuum brazed or bonded together and any required inlet and outlet connections and tanks can be welded to the bonded stacked assembly.

By way of example only, in a disc of say 150 mm diameter, the outer peripheral annulus may be 12 mm in radial extent, the outer frusto-annular perforations or slots of which there may be, for example, four, may be 13 mm in radial extent. The inner annulus may be 12 mm in radial extent. The spokes from the central hub and the limbs may be about 6 mm wide or as required to provide good heat transfer by conduction to the wetted perimeters. Where the discs are of aluminium, such a construction will give extremely good heat transfer via the spokes and the inner annuli between the first and second fluids.

It will be appreciated that, if desired, the second type of disc may be provided with discontinuities or gaps in its peripheral annulus so as to provide two or more inlets and/or outlets whereby flow distribution may be improved or two or more second fluids utilised.

BRIEF DESCRIPTION OF THE DRAWINGS

Embodiments of the invention will now be described by way of example only with reference to the accompanying drawings in which.

DESCRIPTION OF THE PREFERRED EMBODIMENTS

Figure 1:
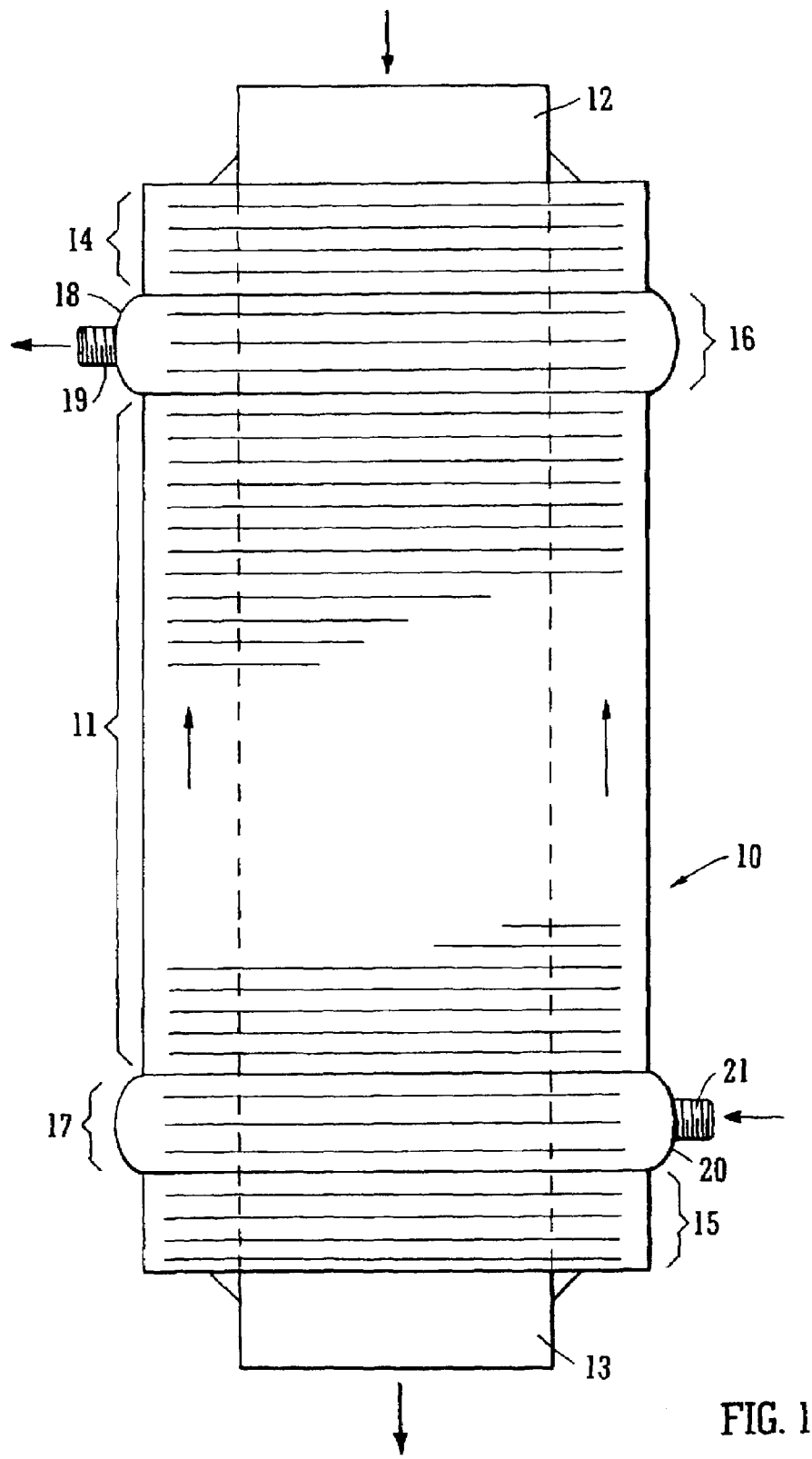
FIG. 1 is a diagrammatic elevation of a bulk fluid heat exchanger according to the invention.

In FIG. 1 a bulk fluid heat exchanger is formed of a stacked assembly 10 of three types of perforated discs. The discs are described in detail below with reference to FIGS. 2, 3 and 4.

The stack has an inlet 12 and an outlet 13 for passage of a bulk fluid through the stack, the inlet and outlet being welded to opposite ends of the stack.

Figure 2:
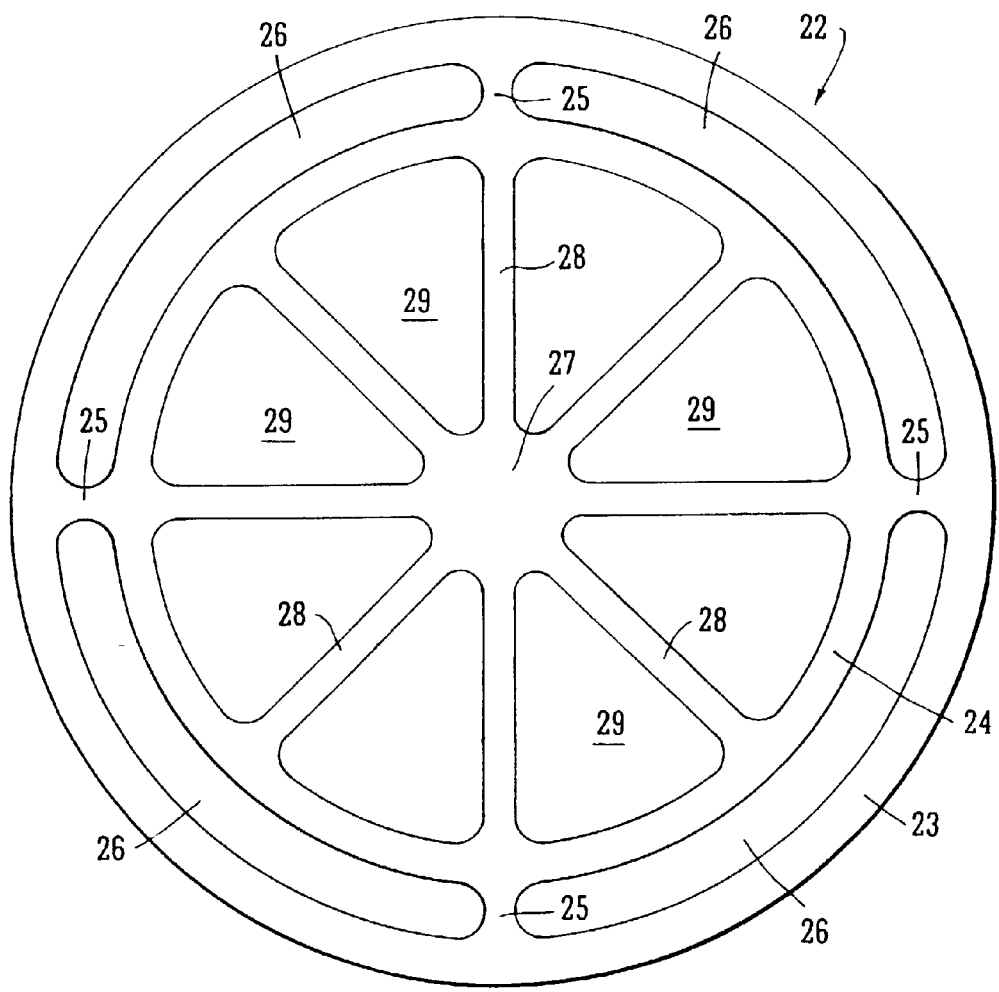
FIG. 2 is a plan view of a first disc for use in the heat exchanger of FIG. 1.

A central portion 11 of the stack length is formed from a first type of disc as shown in FIG. 2.

Figure 4:
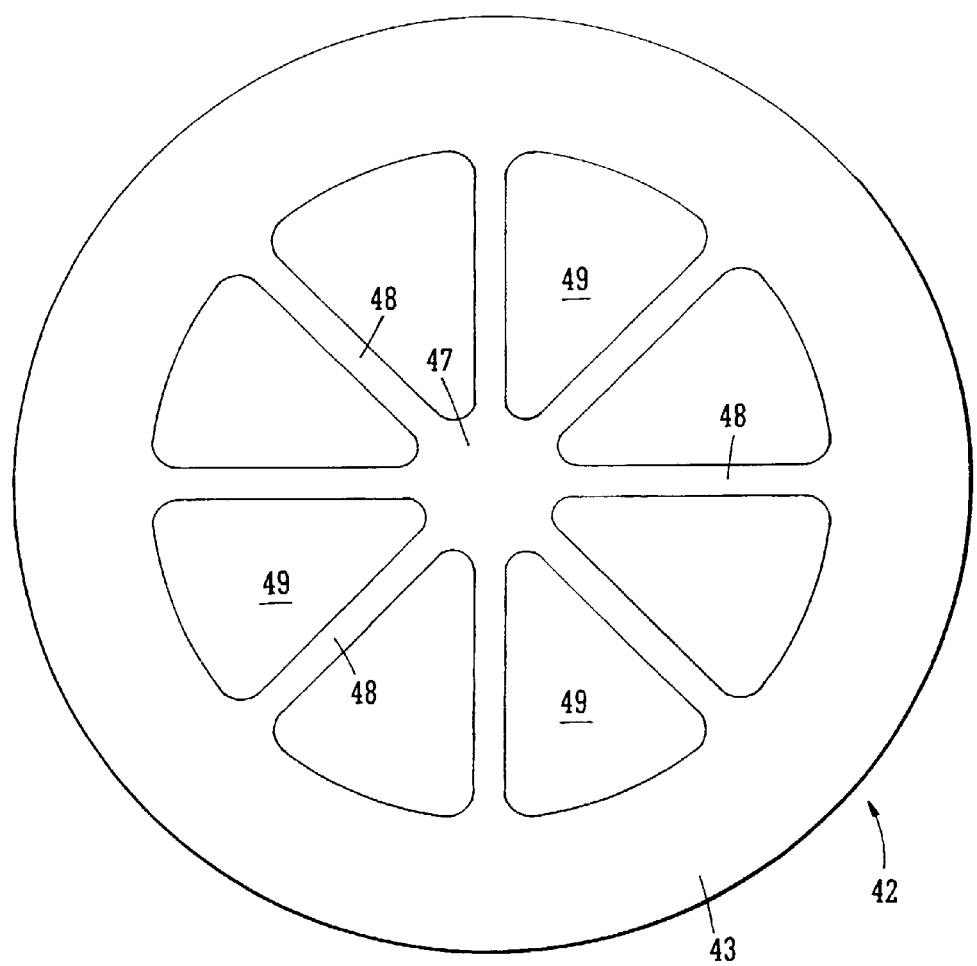
FIG. 4 is a plan view of a third disc for use in the heat exchanger of FIG. 1.

An end portion 14 of the length of the stack at the inlet end 12 is formed from a third type of disc as shown in FIG. 4 and an end portion 15 of the length of the stack at the outlet end 13 is also formed from the third type of disc shown in FIG. 4.

Figure 3:
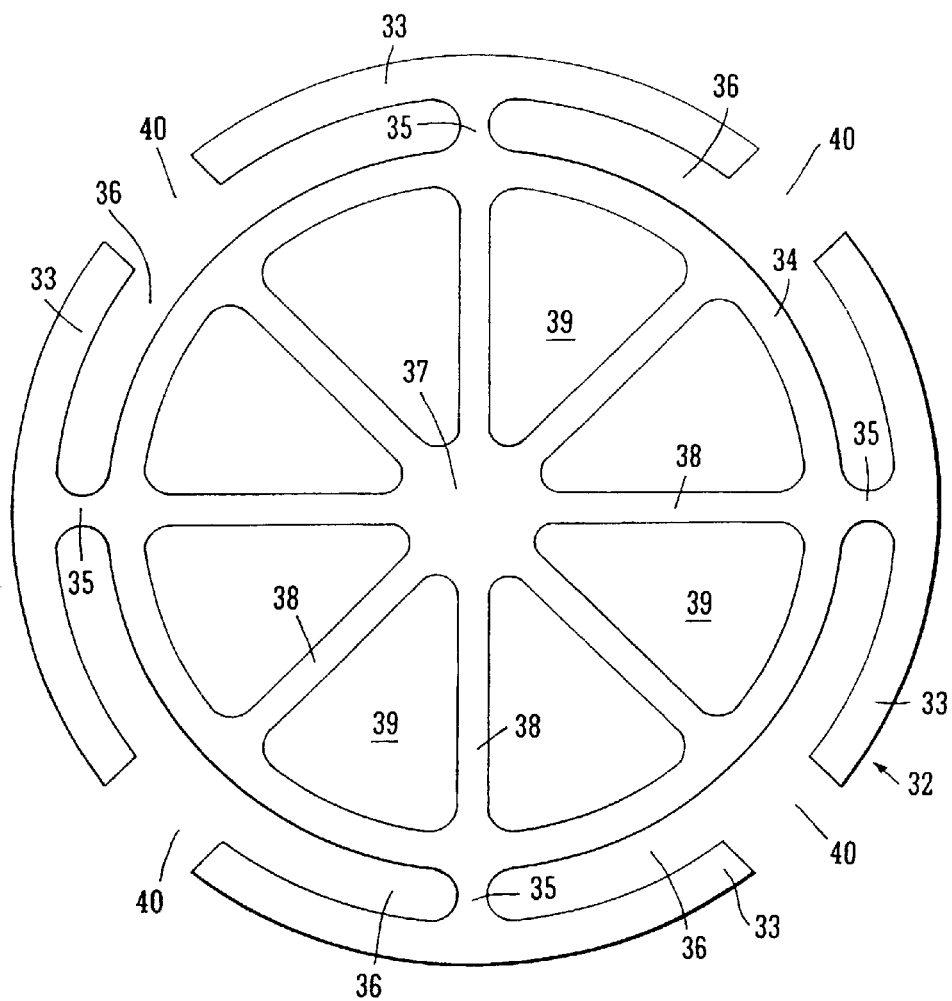
FIG. 3 is a plan view of a second disc for use in the heat exchanger of FIG. 1.

In between portions 11 and 14 of the stack is a portion 16 formed from a second type of disc shown in FIG. 3. In between portions 11 and 15 is a portion 17 also formed from a second type of disc of FIG. 3. Portion 16 is surrounded by an annular tank 18, sealed to the stack by welding. An outlet 19 from tank 18 provides an outlet from the portion 16 for a second fluid, i.e. a cooling or heating fluid for the desired heat exchange with the bulk fluid. Portion 17 is similarly surrounded by an annular tank 20 sealed to the stack by welding. An inlet 21 to tank 20 provides an inlet to the portion 17.

The first discs, i.e. of the portion 11 of the stack, are as shown in FIG. 2. Each disc 22 comprises an outer circumferential annulus 23 joined to an inner annulus 24 by four equi-spaced radially-extending limbs 25. The inner and outer annuli and the limbs define four part- or frusto-annular apertures or slots 26 and these apertures in portion 11 stack together to form part of the through passageway between inlet 21 and outlet 19 for the second fluid.

At the centre of the disc 22 is a hub 27 from which radiate outwardly eight equi-spaced spokes 28 to join the hub to the inner annulus 24. Four of the spokes each lie in correspondence with a limb 25 and each of the other four spokes lies midway between a pair of adjacent limbs.

The spokes 28, hub 27 and inner annulus 24 define a central passageway when the discs are stacked together, the passageway being in the form of eight equal and separate, generally triangular passageways formed by the alignment of eight apertures 29. Thus passageways formed by apertures 29 form part of the central through passageway for the bulk fluid between inlet 12 and outlet 13 of the stack.

The second discs, i.e. of portions 16 and 17, are as shown in FIG. 3. Each disc 32 comprises an outer circumferential annulus 33 joined to an inner annulus 34 by four equi-spaced radially-extending limbs 35. Annulus 33, however, is not continuous but has four equi-spaced discontinuities 40. As with disc 22, the inner annulus 34 and outer annulus 33 with the limbs 35 form four frusto-annular apertures 36 which in the stack provide continuation of the second fluid flow passages in portion 11. Each aperture 36 has a corresponding discontinuity 40. The discontinuities 40 provide, in the case of portion 16, an outlet from the second fluid flow passages to the tank 18 and then through the outlet 19 and provide, in the case of portion 17, an inlet to the second fluid flow passages from tank 20 and inlet 21. Thus the second fluid can flow through the stack between inlet 21 and outlet 19. The second fluid flow passages are blocked from travelling into the end portions 14 and 15 of the stack as will be described in more detail below.

Discs 32 each have a central construction identical to discs 22. Thus each has a central hub 37 and eight radiating equi-spaced spokes 38 to join the hub to inner annulus 34 and the discs each provide eight apertures 39, which stack to form a central passageway made up of eight generally triangular passageways for the bulk fluid. Apertures 29 and 39 are aligned in the stack.

The third discs, i.e. of portions 14 and 15, are as shown in FIG. 4.

Each disc 42 has a circumferential annulus 43 of sufficient radial extent to cover annuli 33 and 34 of discs 32 when they are stacked together concentrically. Thus annulus 43 closes the second fluid passageways formed by the alignment of the passageways formed by apertures 26 and 36 at the outer ends of portions 16 and 17 of the stack.

The central region of disc 42 is the same as for discs 22 and 32 in that it has a central hub 47 and eight equi-spaced radially-extending spokes 48 between the hub and annulus 43 to define eight generally triangular apertures 49. Again these apertures in the stack form a continuation of the eight central passageways for the bulk fluid in portions 11, 16 and 17 of the stack. Portion 14 is fed from inlet 12 and portion 15 feeds to outlet 13 (FIG. 1).

Normally, it will be sufficient to have a single disc 42 at each end of the assembly.

Figure 5:
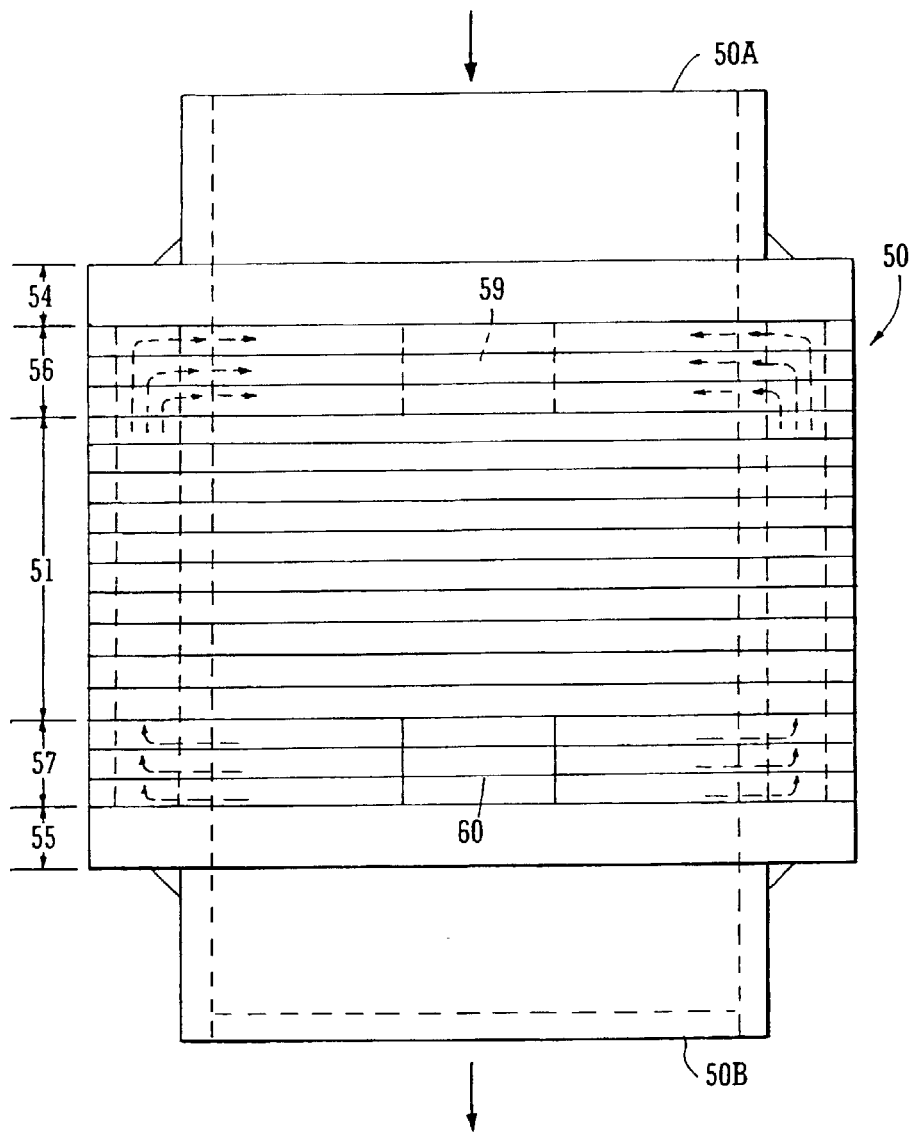
FIG. 5 is a similar view to FIG. 1 of another bulk fluid heat exchanger of the invention.

In FIG. 5 a second bulk fluid heat exchanger of the invention having integral inlet and outlet openings is again formed of a stacked assembly 50 of three types of perforated discs. The discs are described below with reference to FIGS. 6, 7 and 8.

The stack has an inlet 50A and an outlet 50B for passage of a bulk fluid through the stack, the inlet and outlet being welded to opposite ends of the stack.

Figure 6:
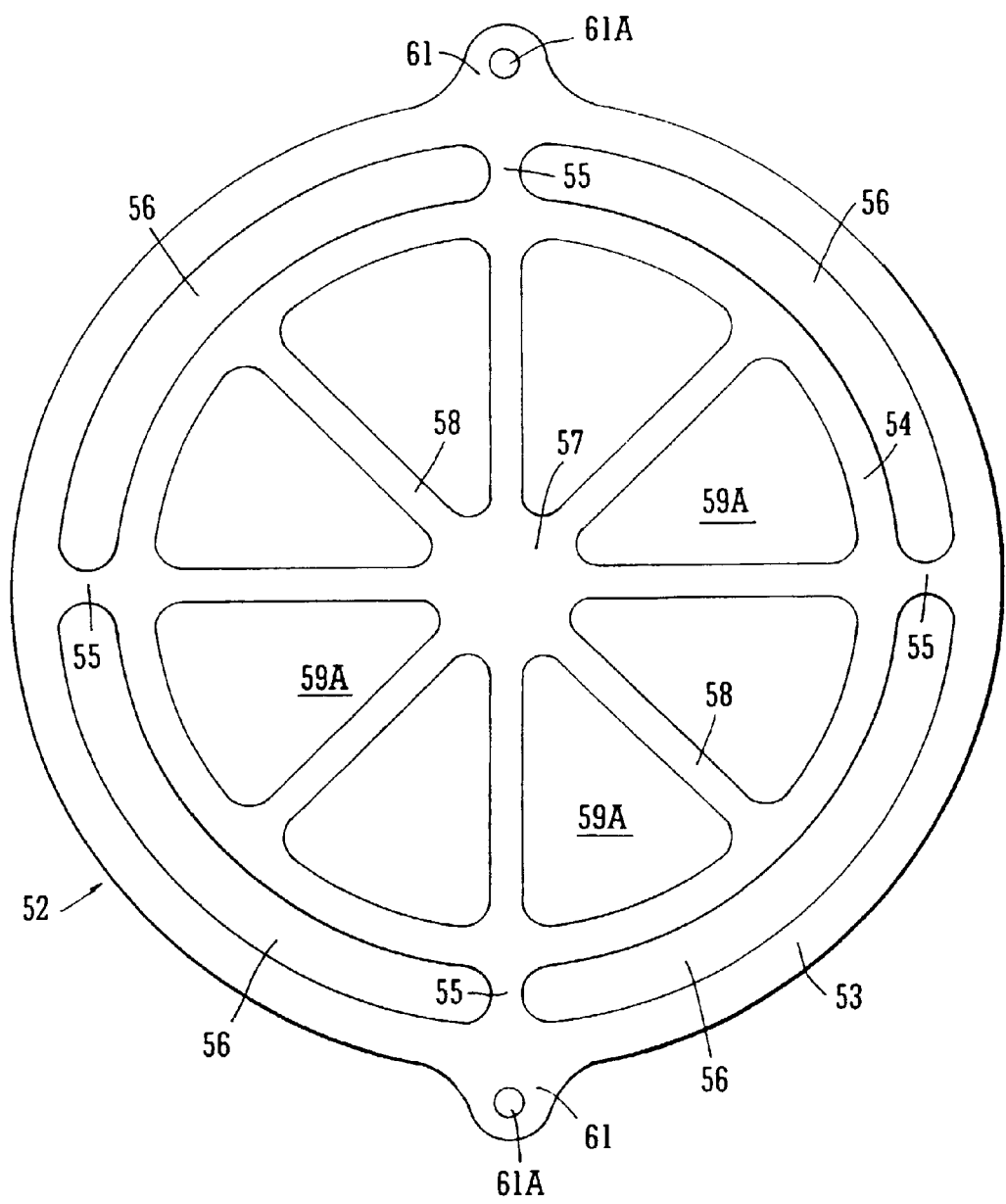
FIG. 6 is a plan view of a first disc for use in the heat exchanger of FIG. 5.

A central portion 51 of the stack is formed from a first type of disc as shown in FIG. 6.

Figure 8:
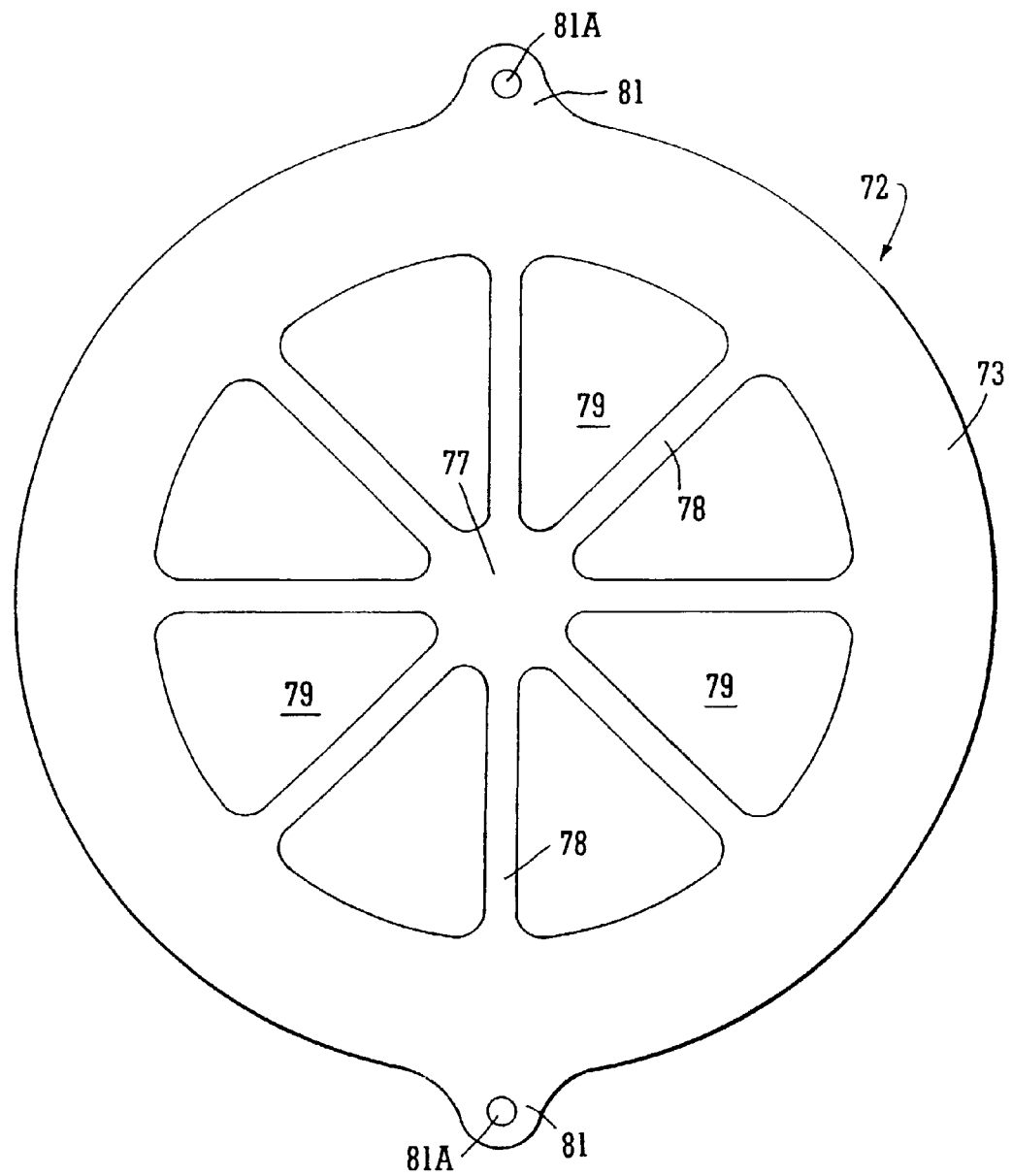
FIG. 8 is a plan view of a third disc for use in the heat exchanger of FIG. 5.

An end portion 54 of the length of the stack at the inlet end 50A is formed from a third type of disc as shown in FIG. 8 and an end portion 55 at the outlet end 50B of the stack is also formed from the third type of disc shown in FIG. 8.

Figure 7:
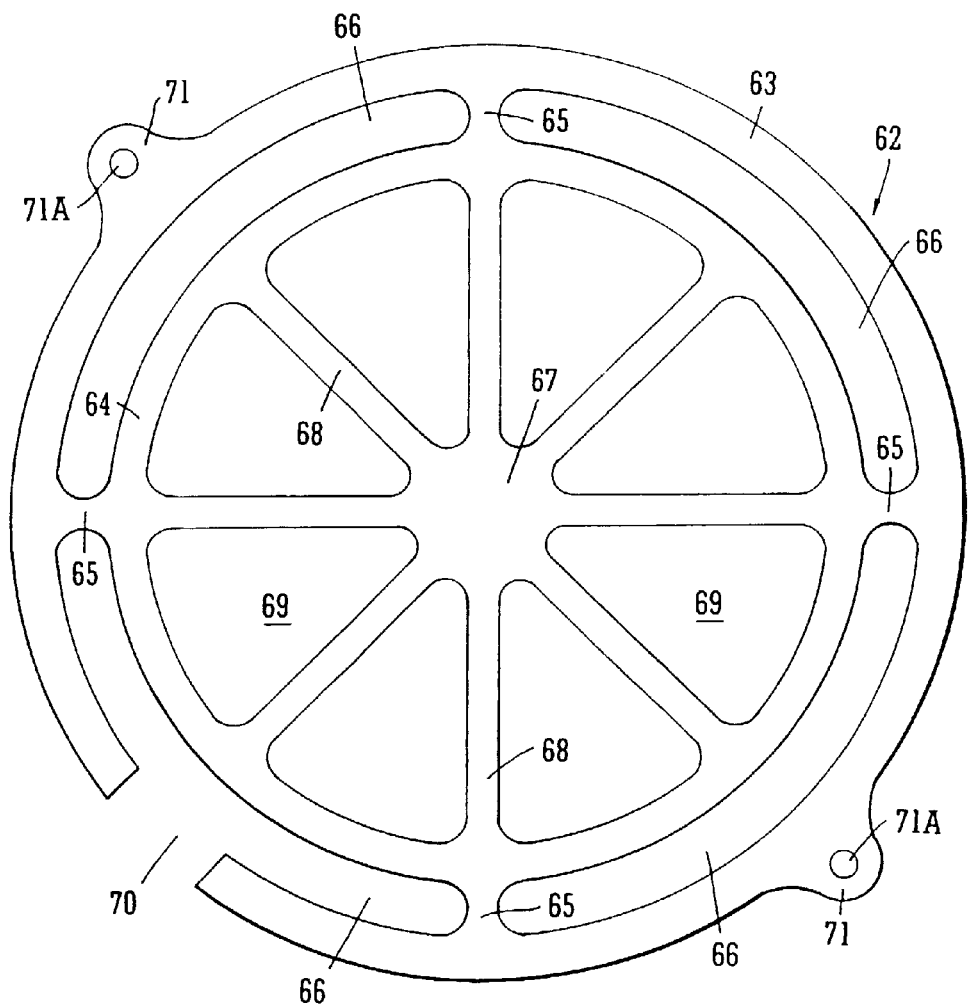
FIG. 7 is a plan view of a second disc for use in the heat exchanger of FIG. 5.

In between portions 51 and 54 of the stack is a portion 56 formed from a second type of discs shown in FIG. 7. In between portions 51 and 55 is a portion 57 also formed from a second type of discs of FIG. 7. An inlet 60 and an outlet 59 for a second fluid, i.e. a cooling or heating fluid, are provided to the stack as will be explained below.

The first discs, i.e. of portion 51 of the stack, are as shown in FIG. 6. Each disc 52 is essentially the same as disc 22 of FIG. 2 and comprises an outer circumferential annulus 53 joined to an inner annulus 54 by four equi-spaced, radially-extending limbs 55. Thus four frusto-annular slots 56 are defined to provide part of the through passageway between inlet 60 and outlet 59 for the second fluid. Hub 57 and spokes 58 are arranged as described with respect to FIG. 2 so as to define with annulus 54 the eight equal apertures 59A, forming the central passageway in the stack for the bulk fluid. The outer perimeter of annulus 53 is provided with a pair of diametrically-opposed lugs 61 having centrally-positioned holes 61A whereby the discs can be readily aligned and stacked.

The second discs, i.e. of portion 56 and 57 are as shown in FIG. 7. Each disc 62 comprises an outer circumferential annulus 63 joined to an inner annulus 64 by four equi-spaced, radially-extending limbs 65, as in the second disc of FIG. 3, thereby defining four frusto-annular apertures 66. Again annulus 63 is not continuous but in this instance has a single discontinuity 70. In the stack this discontinuity 70 is aligned with either inlet 60 or outlet 59 to allow the second fluid to flow through the stack.

Each disc 62 is rotated through 45° relative to the discs 52 in the stack so that its limbs are offset from those of discs 52. Fluid that flows from the inlet 60 through discontinuity 70 into one aperture 66 can then flow over limbs 65 and into the other apertures 66 and thereby into the second fluid frusto-annular passageways formed by apertures 56 in the portion 51 of the stack. Similarly outward flow passes from around the stack into the outlet 59 via the single discontinuity 70 in the disc 62 outlet.

Discs 62 are otherwise similar to discs 32, having a central hub 67 and eight radiating spokes 68 to provide eight apertures 69 for the central passageway. However, discs 62 have a pair of diametrically-spaced circumferential lugs 71 with holes 71A corresponding to the lugs 61 and holes 61A of discs 52.

The third discs, i.e. of portions 54 and 55, are shown in FIG. 8.

Each disc 72 is similar to discs 42 of FIG. 4 and has a circumferential annulus 73 of radial extent to cover annuli 63 and 64 of discs 62 when they are stacked concentrically. Thus annulus 73 closes the second fluid passageways at the outer ends of portions 56 and 57 of the stack.

The central region of disc 72 is as for discs 52 and 62, having a central hub 77 and eight radial spokes 78 defining apertures 79 to form the central passageways.

Disc 72 also has a pair of diametrically-opposed circumferential lugs 81 with holes 81A to correspond with the lugs on discs 52 and 62.

Figure 9:
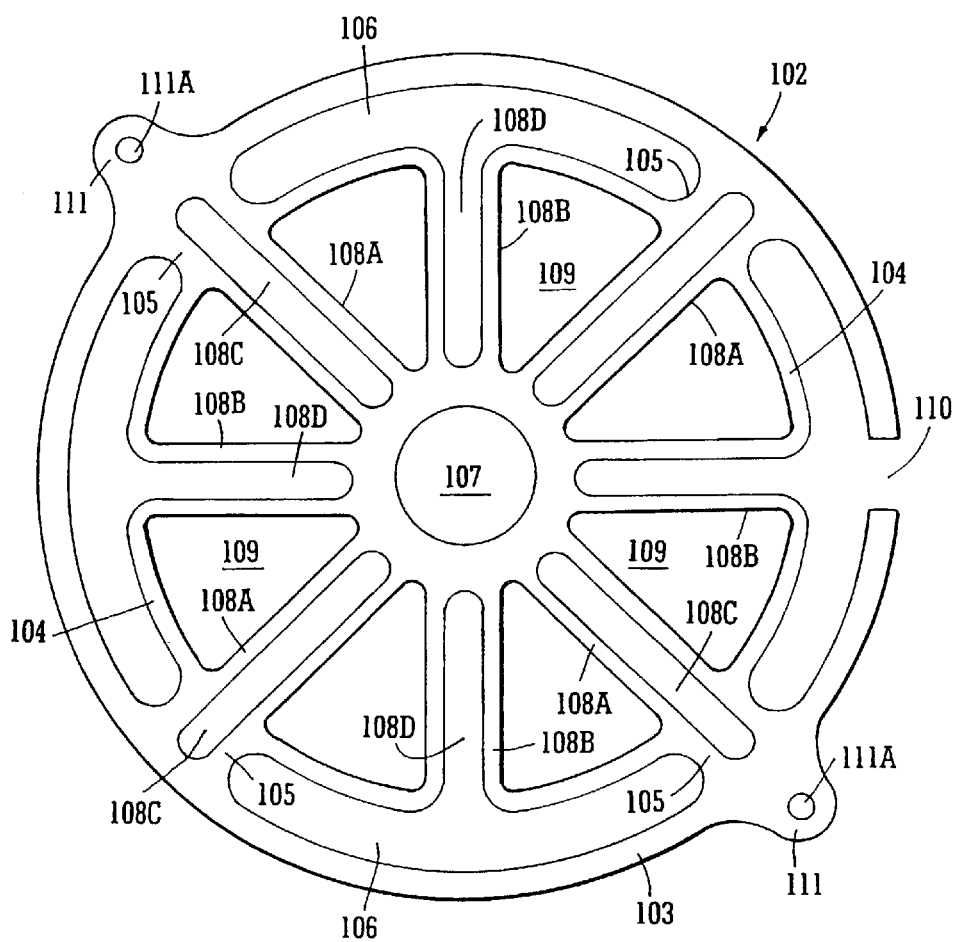
FIG. 9 is a plan view of an alternative form of second disc.

In FIG. 9 second disc 102 has an outer circumferential annulus 103 joined to an inner annulus 104 by four equi-spaced, radially-extending hollow limbs 105, which continue to a hollow central hub 107 by means of four hollow radiating spokes 108A. Four hollow radiating spokes 108B from hub 107 are equi-spaced between spokes 108A but each spoke 108A opens into a frusto-annular aperture 106 defined between the inner and outer annuli. The exterior surface of spokes 108 A and 108B and portions of the exterior radially inward surface of apertures 106 define apertures 109 for the central passageways. Inside hollow spokes 108A are defined apertures 108C to provide central passageways for the second fluid and inside the hollow spokes 108B are defined radial extensions 108D of apertures 106, also for the second fluid as will be explained in more detail below.

Annulus 103 again is not continuous and has a discontinuity 110 which in a stack of discs aligns with an inlet or an outlet for a second fluid.

The disc 102 also has a pair of diametrically opposed circumferential lugs 111 with holes 111A for stacking purposes.

Figure 10:
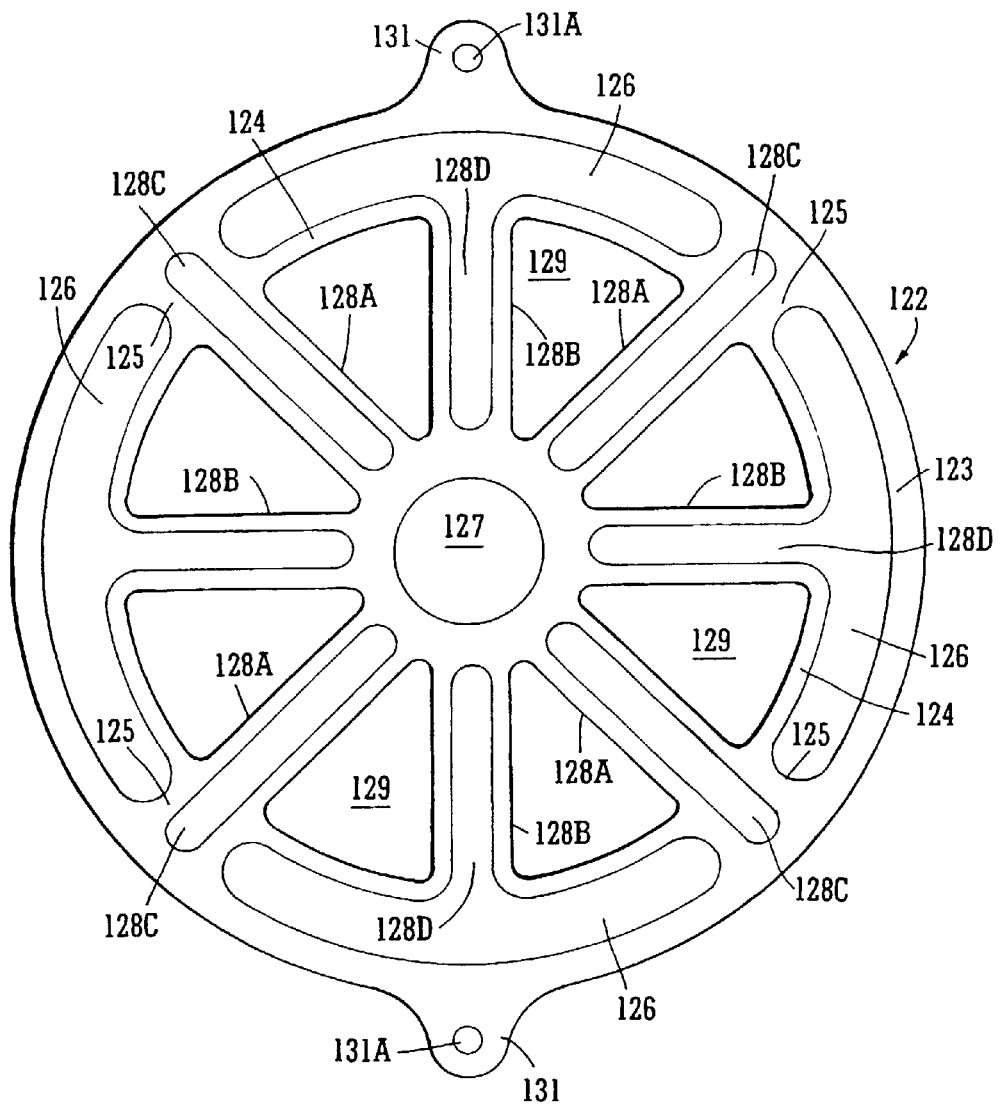
FIG. 10 is a plan view of an alternative form of first disc.

A type of first disc 122 suitable for use with second disc 102 is shown in FIG. 10. It has an outer circumferential annulus 123 joined to an inner annulus 124 by four equi-spaced radially-extending hollow limbs 125, the limbs continuing to a hollow central hub 127 by means of four hollow radiating spokes 128A. Four hollow radiating spokes 128B from hub 127 are equi-spaced between spokes 128A but each opens into a frusto-annular aperture 126 defined between the inner and outer annuli. The exterior surfaces of spokes 128A and 128B and of slots 126 again define apertures 129 for the central passageways. Inside hollow spokes 128A are defined apertures 128C to provide central passageways for the second fluid and inside hollow spokes 128B are defined radial extensions 128D of apertures 126 for the second fluid.

The perimeter of the disc has a pair of lugs 131 with apertures 131 A.

Figure 11:
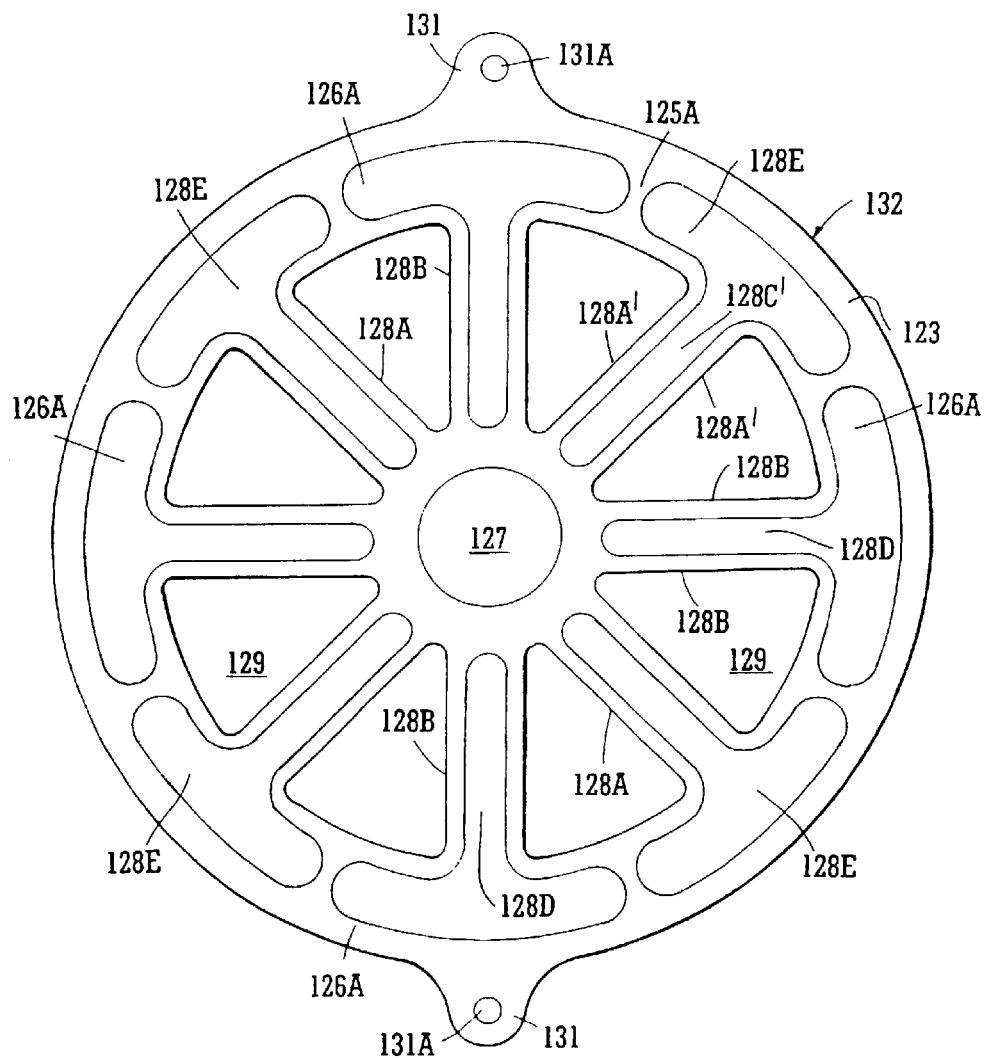
FIG. 11 is a plan view of another form of first disc.

A further type of first disc 132 is shown in FIG. 11. It has basically the same construction as disc 122 of FIG. 10 except as now explained. Like parts in FIGS. 10 and 11 are given like reference numbers. In disc 132 the apertures 126A are reduced in length in the circumferential direction compared to apertures 126 of FIG. 10. Radial apertures 128C inside spokes 128A' have been opened out at their radially outer ends to form arcuate extensions 128E similar to apertures 126A. Limbs 125A between apertures 126A and extension apertures 128E are thereby offset from spokes 128A and hence are offset in relation to limbs 105 and 125 in discs 102 and 122.

Thus when discs 102, 122 and 132 are stacked in a similar manner to that shown in FIG. 5, the central passageways for a first fluid are provided by apertures 107,127, 129 and 109. The passageways for the second fluid are provided by apertures 126, 126A, 106, 128C, 128D, 128C 128E, 108 and 108C.

Figure 12:
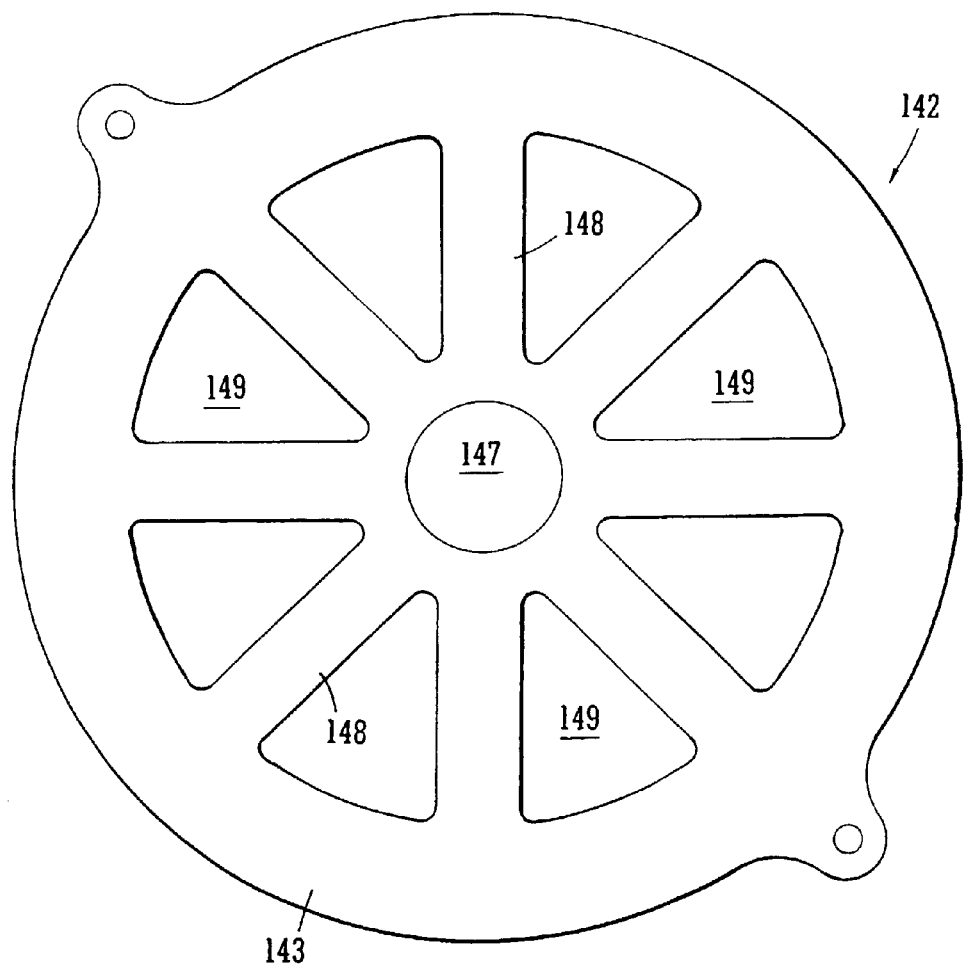
FIG. 12 is a plan view of an alternative form of third disc.

A type of third disc 142 for closing off the outer passageways formed by discs 102 and 122 is shown in FIG. 12.

Disc 142 has a circumferential annulus 143 of sufficient radial extent to cover annuli 103 and 104 of disc 102 when they are stacked together concentrically and can, therefore, be used to close the second fluid passageways at each end of a stack.

The central region of disc 142 has a hollow central hub 147 that can align with hollow hubs 107 and 127 of discs 102, 122 and 132 to provide a central through-flow passage in a stack. It also has eight radiating spokes 148 to define eight central apertures to correspond to central apertures 109 and 129 of discs 102, 122 and 132, thereby continuing the first fluid passageways in a stack. Spokes 148 are of sufficient width to close off the passageways formed by the hollow spokes and limbs of discs 102,122 and 132.

Figure 13:
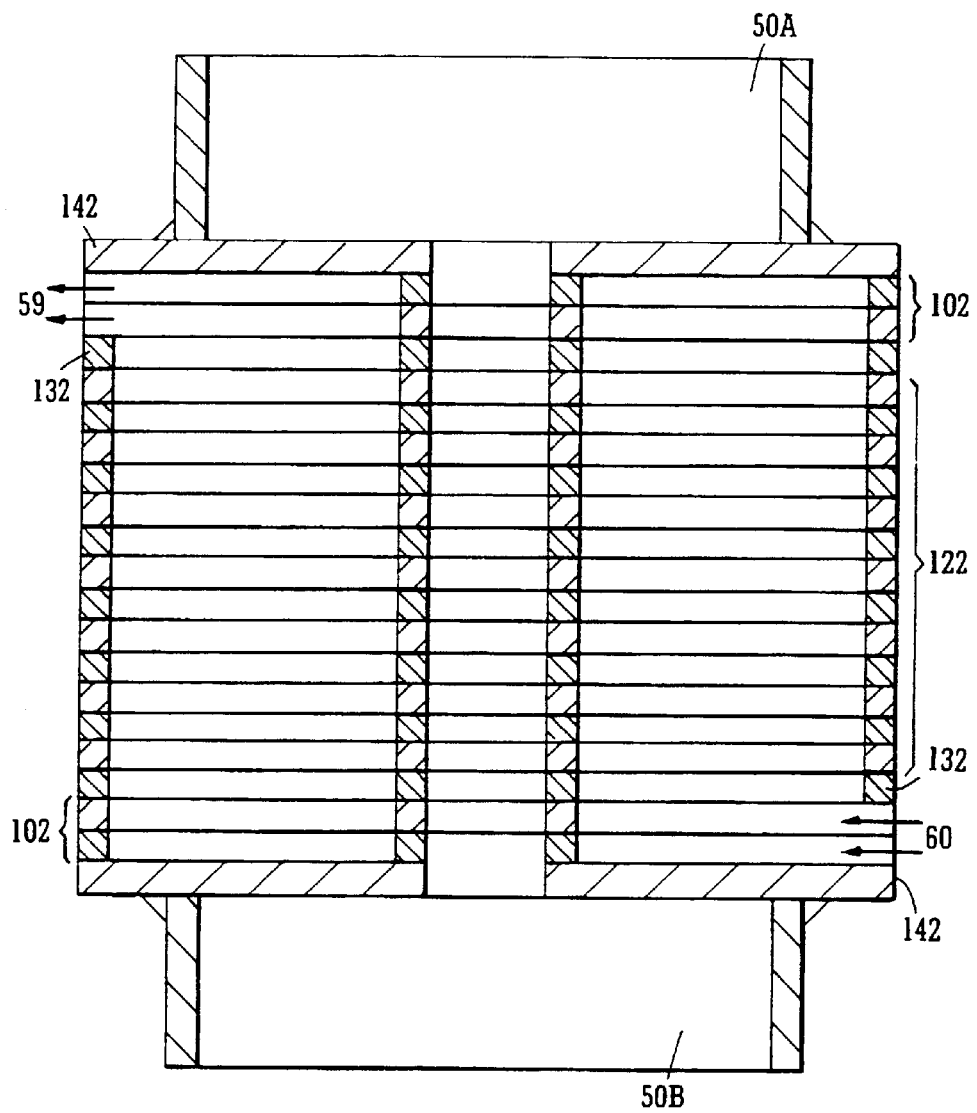
FIG. 13 is a vertical section through a stack of discs incorporating discs of FIGS. 9, 10, 11 and 12.

FIG. 13 shows a vertical section through a stack of discs of the types shown in FIGS. 9, 10, 11 and 12. The stack has an inlet 50A and an outlet SOB as described before for a first fluid. It also has an inlet 60 and an outlet 59, for a second fluid. It has end discs 142 to close off the second fluid passageways and a stack of two second discs 102 and one first disc 132 at each end of the stack immediately inside their respective disc 142. Between the stacks of discs 102 and 132 lies a stack of first discs 122.

Coolant, i.e. second fluid, flow enters as shown by the arrow at inlet 60 through the discontinuity 110 of each the second discs 102. Some flow of the second fluid passes into channels formed by the hollow spokes and limbs of the discs and this flow will pass vertically upwards through the stack. Flow also travels clockwise and anticlockwise around discs 102. Clockwise and anticlockwise flow can take place circumferentially because of the offsetting between plates 102 and plate 132 and between plate 132 and plates 122 of the limbs 105, 125A, and 125.

The closure plate 142, i.e. the third type of disc, at the end of the stack ensures that flow is directed upwardly through the channels defined by the imposition of the various apertures.

At the top of the stack a further closure plate of the type of disc 142 will contain the coolant flows forcing an exit via a fluid outlet 59. This outlet, as with the inlet, comprises two plates 102 each with a discontinuity 110 for that purpose.

Figure 14:
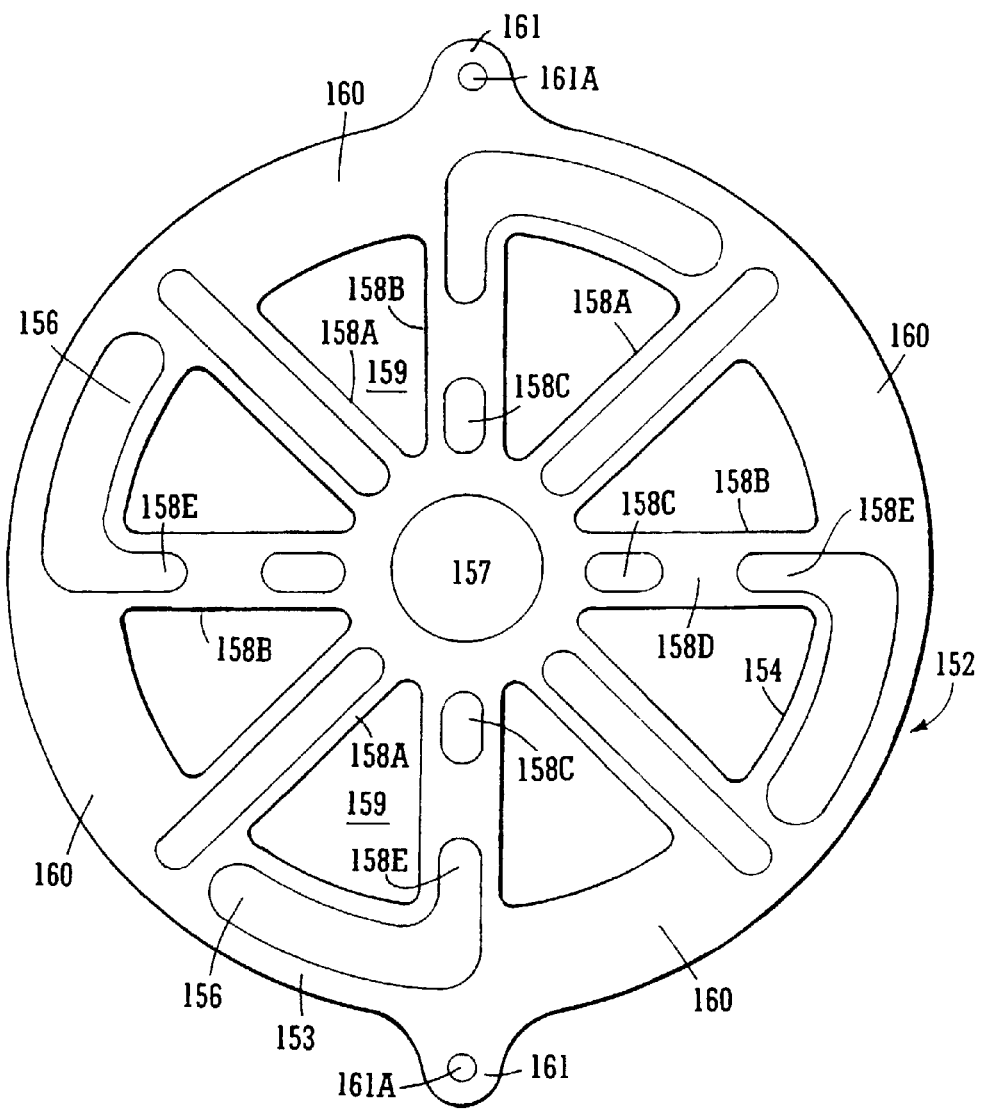
FIG. 14 is a plan view of a supplementary type of disc.

The supplementary disc 152 shown in FIG. 14 is a diverter plate which, when inserted in the stack can improve and optimise distribution of a cooling or heating second fluid, particularly if used immediately after the entry point or inlet. Alternate spokes 158A are similar to spokes 108A of FIG. 9. The intervening alternate spokes 158B have an inner aperture 158C, a solid central web portion 158D and an outer aperture 158E. Each aperture 158E continues into a frusto-annular aperture 156 between the outer circumferential annulus 153 of the disc and an inner annulus 154 to form a generally L-shaped aperture.

The spokes 158A and 158B provide apertures 159 which define central passageways for the first fluid in the stack.

The four apertures 156 alternate between four solid frusto-annular portions 160 of the disc, these portions being provided by a joining together of annuli 153 and 154 to form a solid web in each of those four regions.

A diametrically-opposed pair of circumferential lugs 161 with holes 161A aid assembly with the other discs of the stack.

Figure 15:
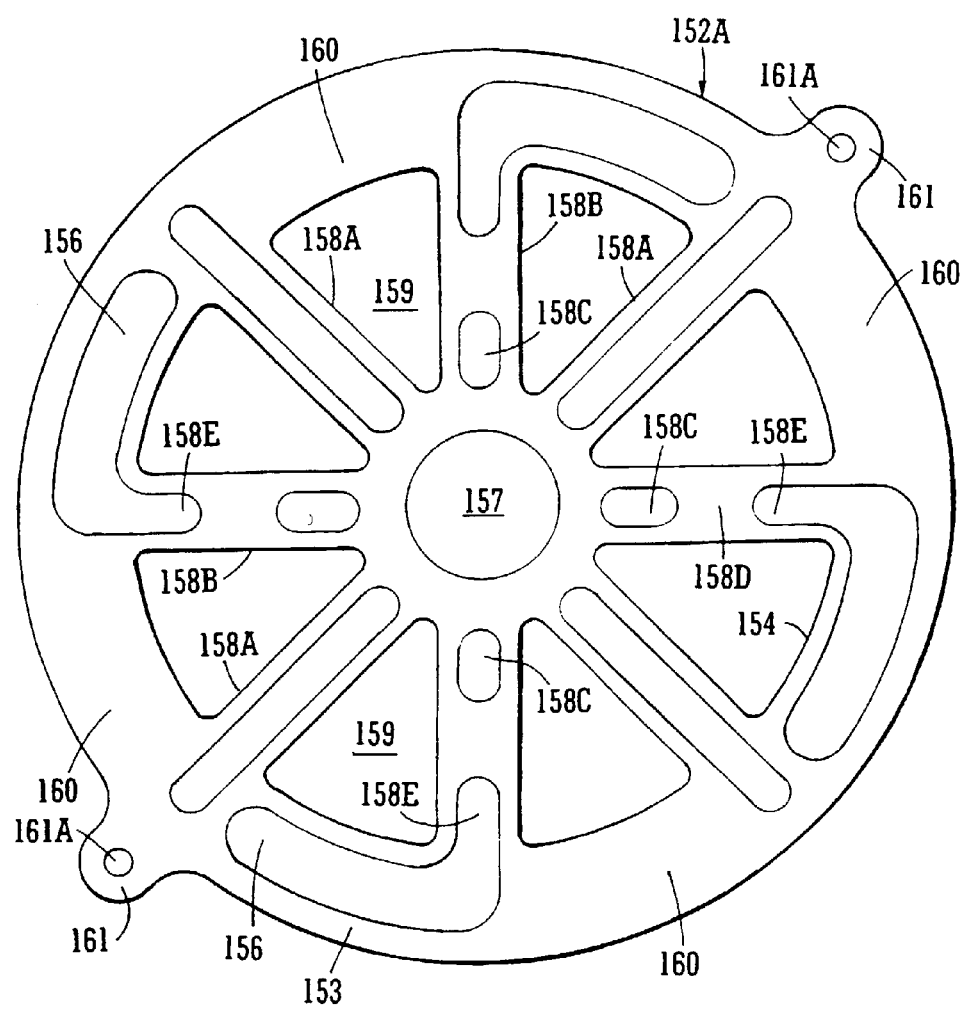
FIG. 15 is a plan view of another supplementary type of disc.

The disc 152 A of FIG. 15 is similar to that of FIG. 14 and so has like parts numbered similarly. However, it will be noted that the lugs 161 are rotated through 45° with respect to those on disc 152. Thus when both discs 152 and 152A are used in a stack the coolant/heat fluid distribution is improved even further and flow starvation in any particular region is far less likely.

Figure 16:
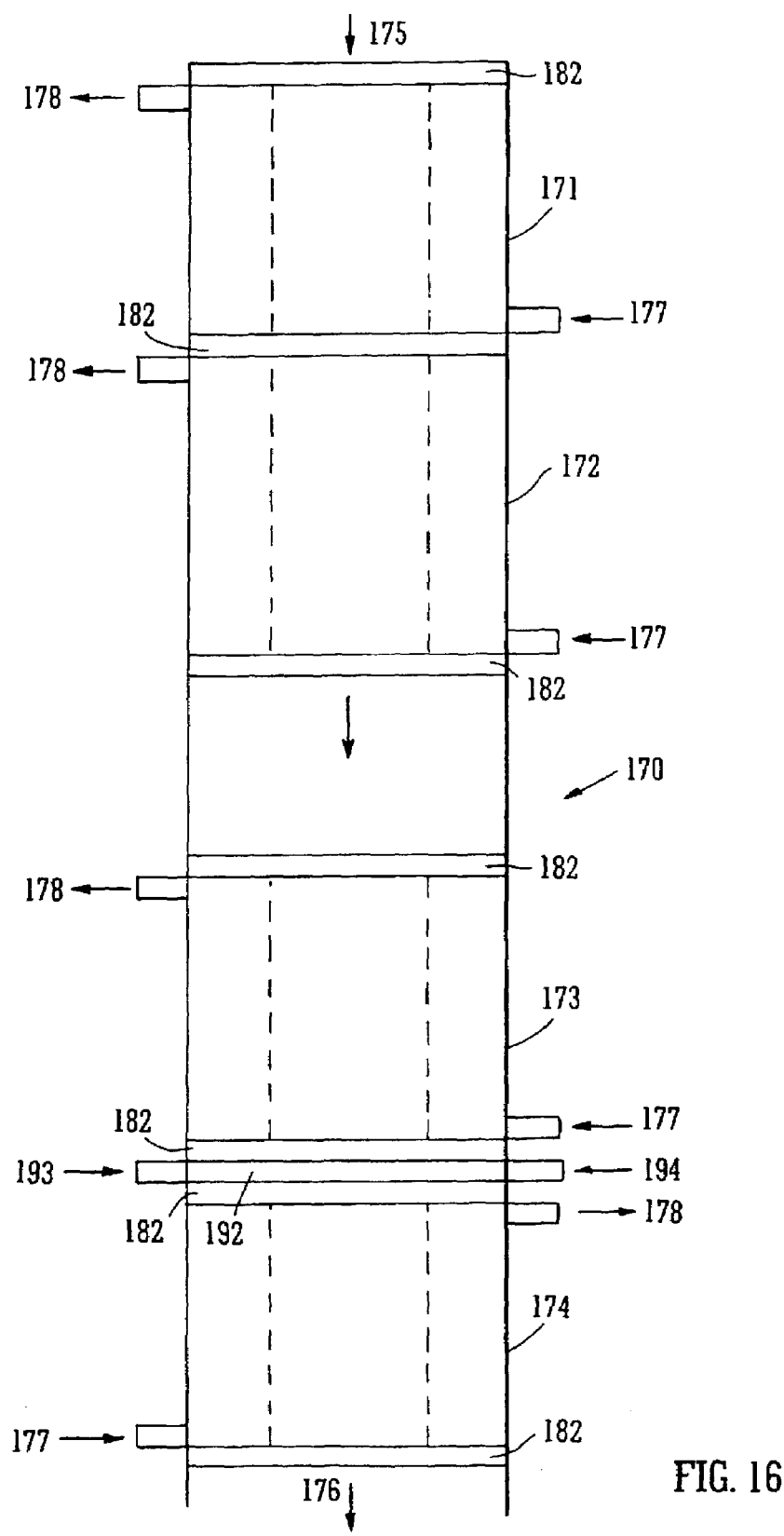
FIG. 16 is a diagrammatic elevation of another bulk fluid heat exchanger of the invention.

In FIG. 16 is shown another heat exchanger of the invention.

This heat exchanger comprises four stacks 171, 172, 173 and 174, the ends of each stack having a closure plate 182 of the third disc type, e.g. as shown in FIG. 11.

First fluid flows through the stack from an inlet end 175 to an outlet end 176.

Each stack 171 to 174 comprises an assembly of first and second type plates as described above between its end closure plates and each stack has an inlet 177 and an outlet 178 for second fluid.

Thus second fluid, e.g. coolant, can enter at the lowest inlet 177 and leave at the lowest outlet 178, thereby cooling the lowest stack 174. Separate coolant flows through inlets 177 and 178 to each of the other stacks 173, 172 and 171 ensures that a long heat exchanger still has adequate cooling over its whole length.

Figure 17:
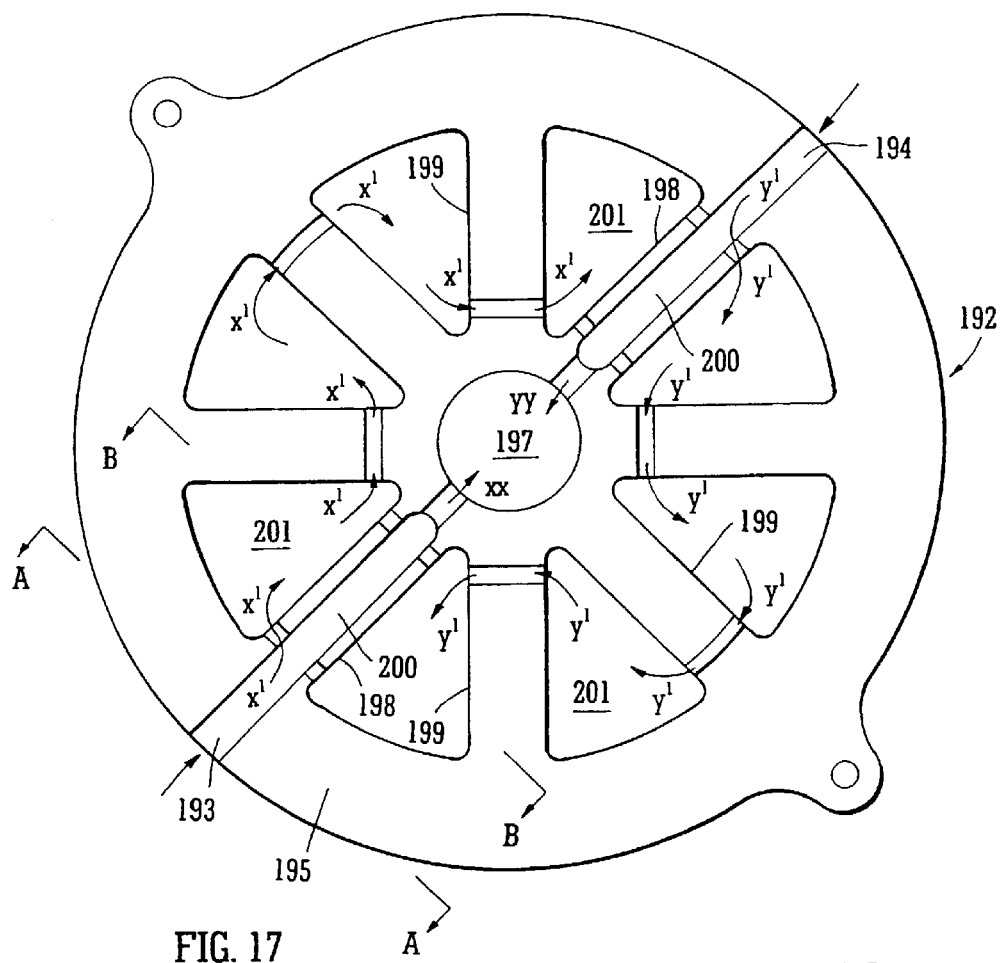
FIG. 17 is a plan view of a disc for use in the heat exchanger of FIG. 16.

In between stacks 174 and 173, i.e. between their respective upper and lower closure plates 182 lies an injection plate 192 which provides a pair of injection inlets 193 and 194 diametrically-opposed across the stack. Plate 192 is shown in detail in FIGS. 17, 18 and 19.

Plate 192 allows injection under pressure of, e.g. air, into the first fluid flowing through the stack and so is particularly useful when the first fluid is a bulk fluid as it can prevent or disperse blockages. Alternatively, it may be used to inject a medium to promote reactions when the stack is used as a packed bed reactor.

The plate has a solid outer annulus 195 of size to cover the outer apertures of the first and second discs in the stack and a pair of diametrically opposed grooved spokes 198 that radiate from a hollow central hub 197 to the diametrically-opposed inlets 193, 194. Six solid spokes 199 radiate from the hub 197, three spokes 199 being equi-spaced in each of the two semi-circles defined by spokes 198 and annulus 195. The spokes define central apertures 201 between the hub and the outer annulus.

Figure 19:
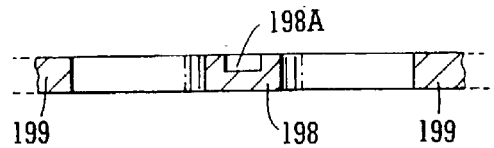
FIG. 19 is a section on line B-B of FIG. 17.
Figure 18:
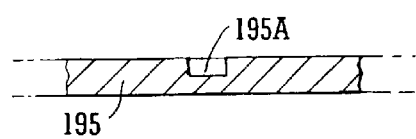
FIG. 18 is a section on line A-A of FIG. 17.

As can be seen in FIGS. 18 and 19 respectively annulus 195 has a pair of radial grooves 195 A providing inlets 193 and 194 and each spoke 198 has a radial groove 198A whereby an injection channel 200 is provided along each spoke 198 to the hollow hub 197, Grooves XX and YY continue the channel 200 into the hollow centre of hub 197.

The bulk fluid, i.e. first fluid, central passageways, defined by apertures 201 between the spokes also receive fluid from channels 200 via grooves X'X' and Y'Y' positioned through the spokes so that circulation of injected air can take place through the apertures 201 as indicated.

When injection of such fluid is not required, it can be isolated via remote stop valves.

It will be appreciated that more injection plates may be positioned along the assembly of stacks, as required.

It will also be appreciated that the central passageways defined by generally triangular apertures 29, 39, 49, 59A, 69 etc. may be of different shapes, e.g. circular.

Figure 20:
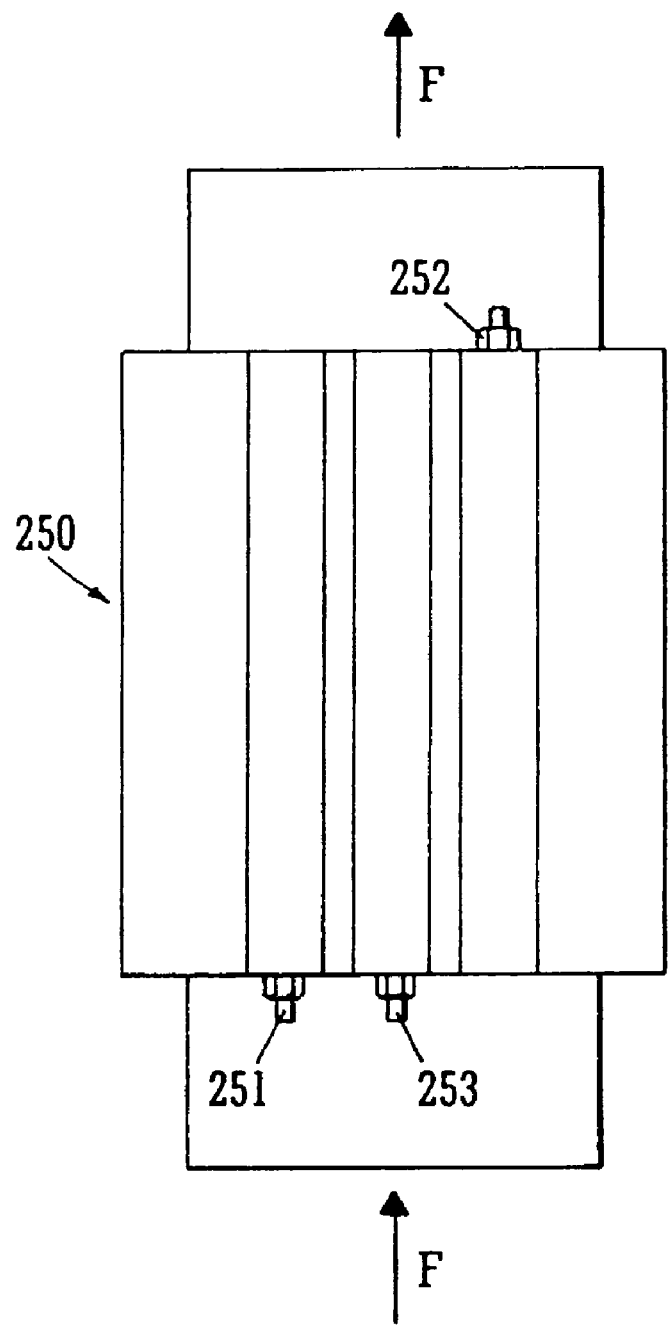
FIG. 20 is a diagrammatic representation of a further apparatus of the invention, being a bulk fluid/heat recuperation heat exchanger with an injection facility.

In FIG. 20 the bulk fluid heat exchanger/heat recuperator 250 has an inlet 251 for coolant, i.e. second fluid, e.g. water, an outlet 252 for the coolant, and an inlet 253 for the injection of a reactant into the first fluid e.g. flue gas, the flue gas passing centrally through the apparatus as indicated by the arrows F, F. The length of the heat exchanger is made from a stack of discs of the types described below.

Flue gases frequently form fatty acid and other heavy deposits on the flue walls with the risk of blockage of the flue. This embodiment of the invention enables a heat recuperation process to take place and additionally enables the injection of, e.g. a fluid at higher pressure, to disrupt the flow partern of the flue gas adjacent the walls to discourage deposits.

Figure 21:
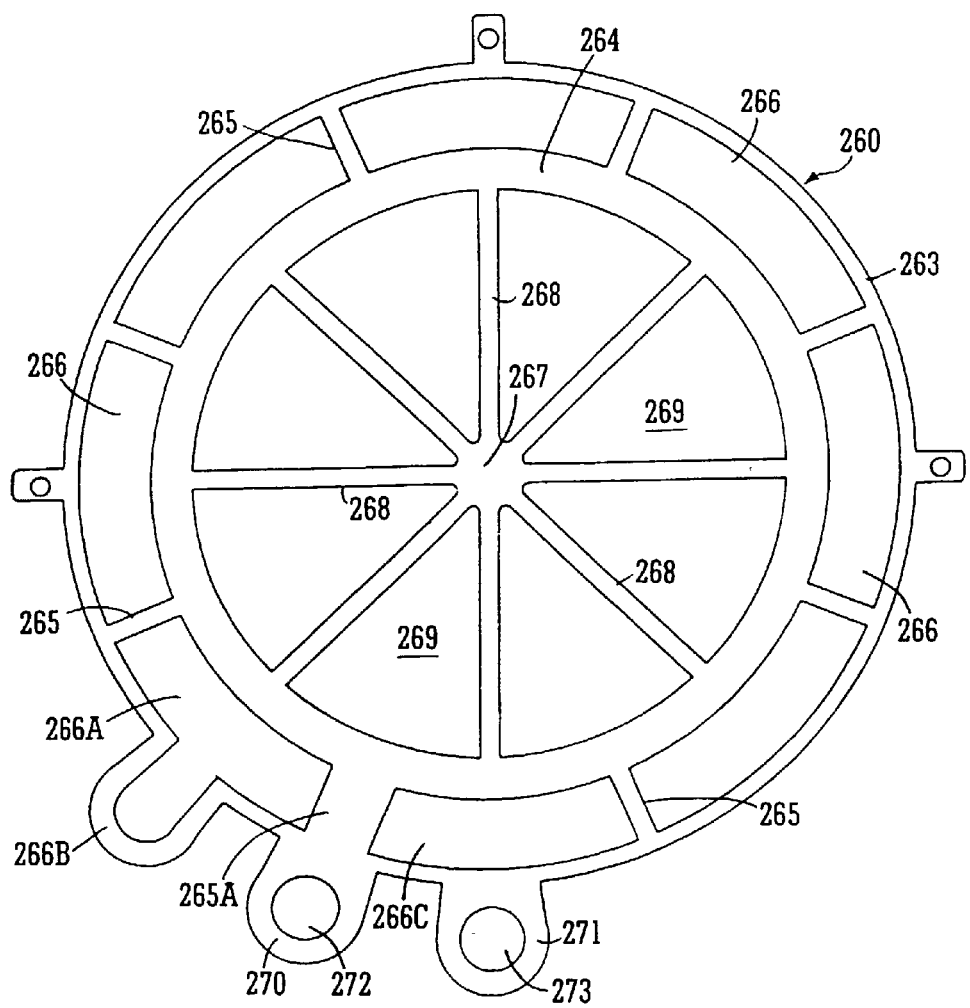
FIG. 21 is a plan view of one second disc for use in the apparatus of FIG. 20.

Disc 260 of FIG. 21 is a "second perforated plate" type of disc having an outer circumferential annulus 263 joined to an inner annulus 264 by seven radially extending limbs 265 and a wider limb 265A. Eight frusto-annular apertures 266 are thereby defined, one of which, 266A, is adjacent to limb 265A and has a circumferential extension loop 266B, which extends beyond the perimeter of annulus 263 and hence provides a discontinuity of the outer peripheral annulus to provide an inlet into the aperture 266A from water inlet 251 (FIG. 20). Apertures 266A and 266C on either side of limb 265 A are of different size to the other apertures 266.

At the centre of the disc is a hub 267 from which eight equi-spaced spokes 268 radiate outwardly to join the hub to the inner annulus 264. The spokes 268 are offset from limbs 265. The spokes 268, hub 267 and inner annulus 264 define eight apertures 269 which align with similar apertures in discs of the stack to provide through passages for the flue gas, i.e. for first fluid.

The perimeter of the disc additionally has two apertured projections 270 and 271 with apertures 272 and 273 respectively which do not communicate with the apertures inside the disc perimeter.

Figure 22:
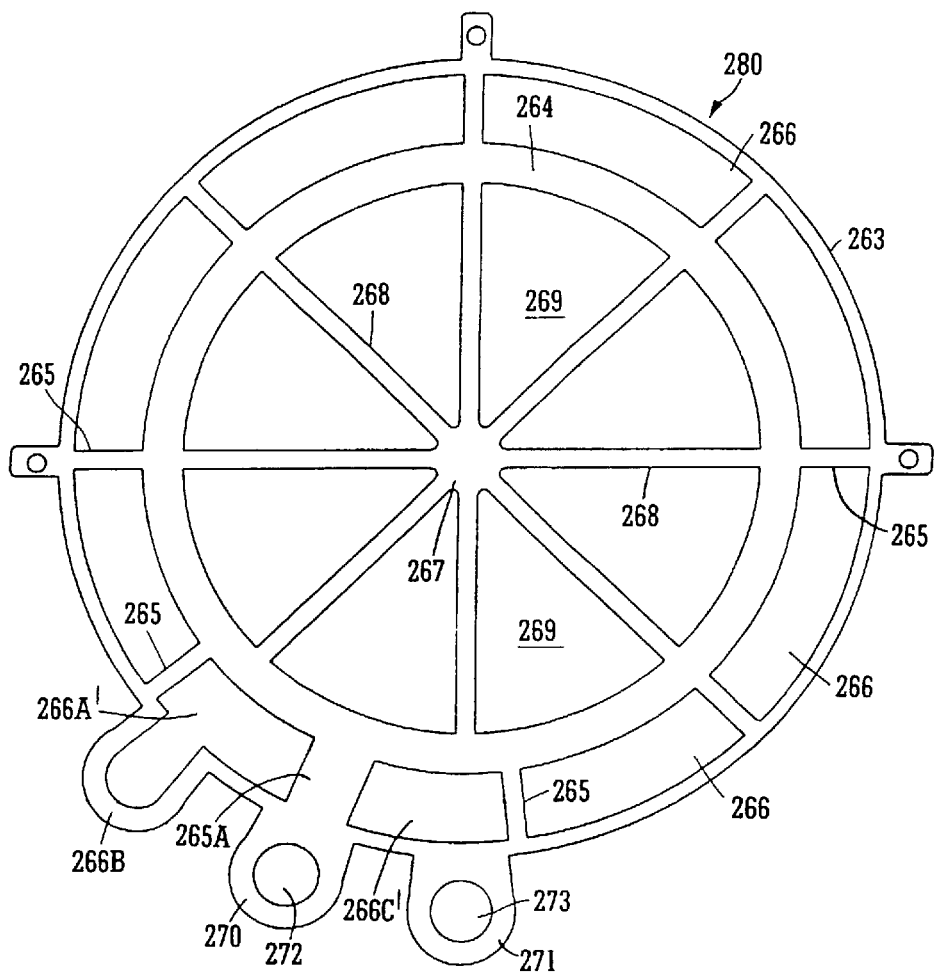
FIG. 22 is a plan view of another second disc for use in the apparatus of FIG. 20.

A similar second type of disc 280 is shown in FIG. 22. Like parts are marked with the same reference numerals as in disc 260 of FIG. 21. However, in this instance, limbs 265 are offset relative to limbs 265 of FIG. 21 and, additionally, aperture 266A', which has extension loop 266B, and aperture 266C are of different length to the corresponding apertures 266A and 266C in FIG. 21. Except for the two limbs 265 which lie one on either side of apertures 266A' and 266C', limbs 265 of disc 280 are effectively radial extensions of spokes 268. By this means, when a disc 260 is stacked next to a disc 280, coolant water may enter through inlets formed by loops 266B and pass not only vertically through the stack of FIG. 20 but also circumferentially around slots 266 by passing under and/or over limbs 265.

A disc 260 will be the next to lowermost disc of the stack forming heat exchanger 250 and a disc 280 will lie immediately above disc 260.

Figure 23:
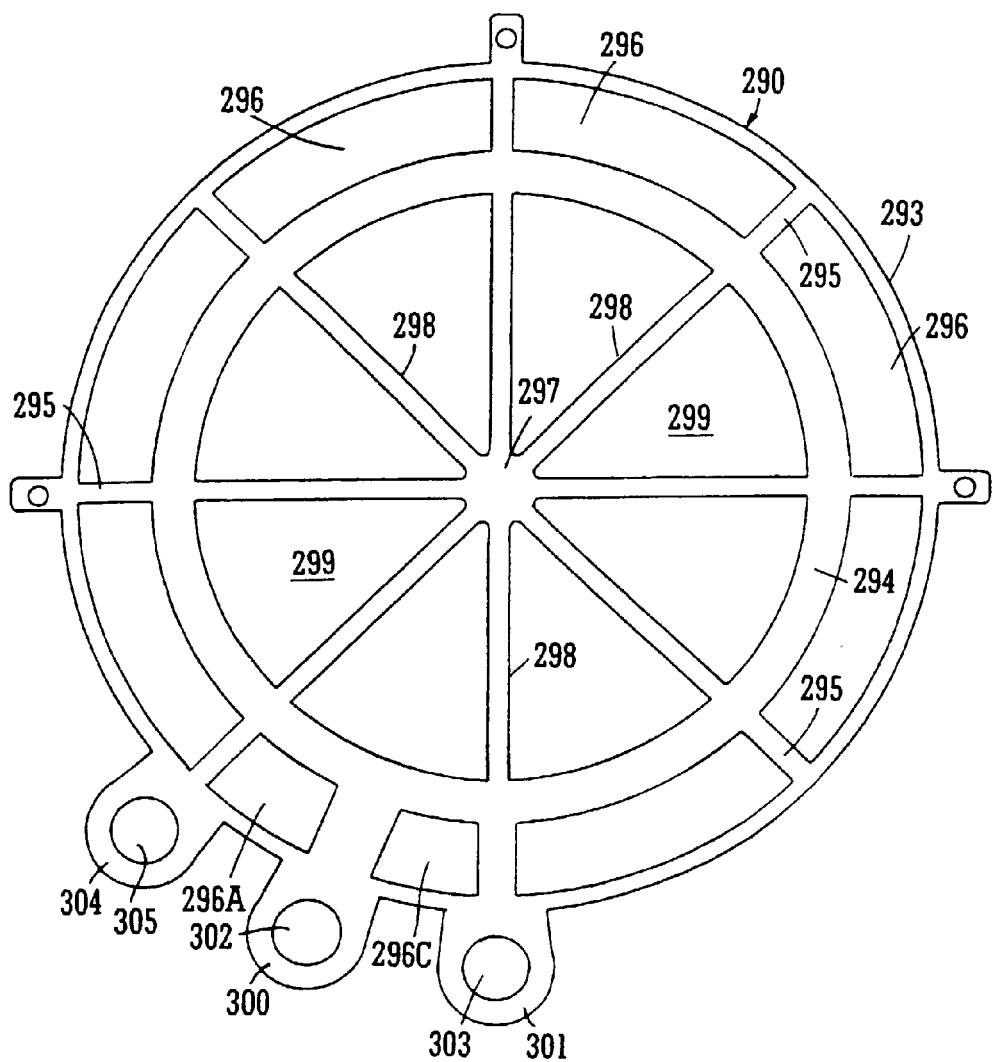
FIG. 23 is a plan view of a first disc for use in the apparatus of FIG. 20.

A "first perforated plate" type of disc 290 is shown in FIG. 23. This is essentially of the same structure as discs 260 and 280 except that it has an apertured projection 304 from its outer circumference with aperture 305 instead of extension loop 266B. Aperture 305 does not communicate into the other apertures of the disc but lies in correspondence in the stack with loops 266B of discs 260 and 280. The disc also has non-communicating projections 300 and 301 with apertures 302 and 303 respectively, these apertures not communicating with the other apertures of the disc and lying in the stack in correspondence with apertures 272 and 273 of discs 260 and 280.

Disc 290 has an outer annulus 293 joined to an inner annulus 294 by limbs 295. These limbs are radially in line with spokes 298 which join central hub 297 to inner annulus 294. Limbs 295 define apertures 296, 296A, 296C for the coolant passing through the stack. Spokes 298 and inner annulus 294 define central apertures 299 for the flue gas flow through the stack.

A plurality of discs 290 are used to form the length of the stack above discs 260 and 280.

Figure 24:
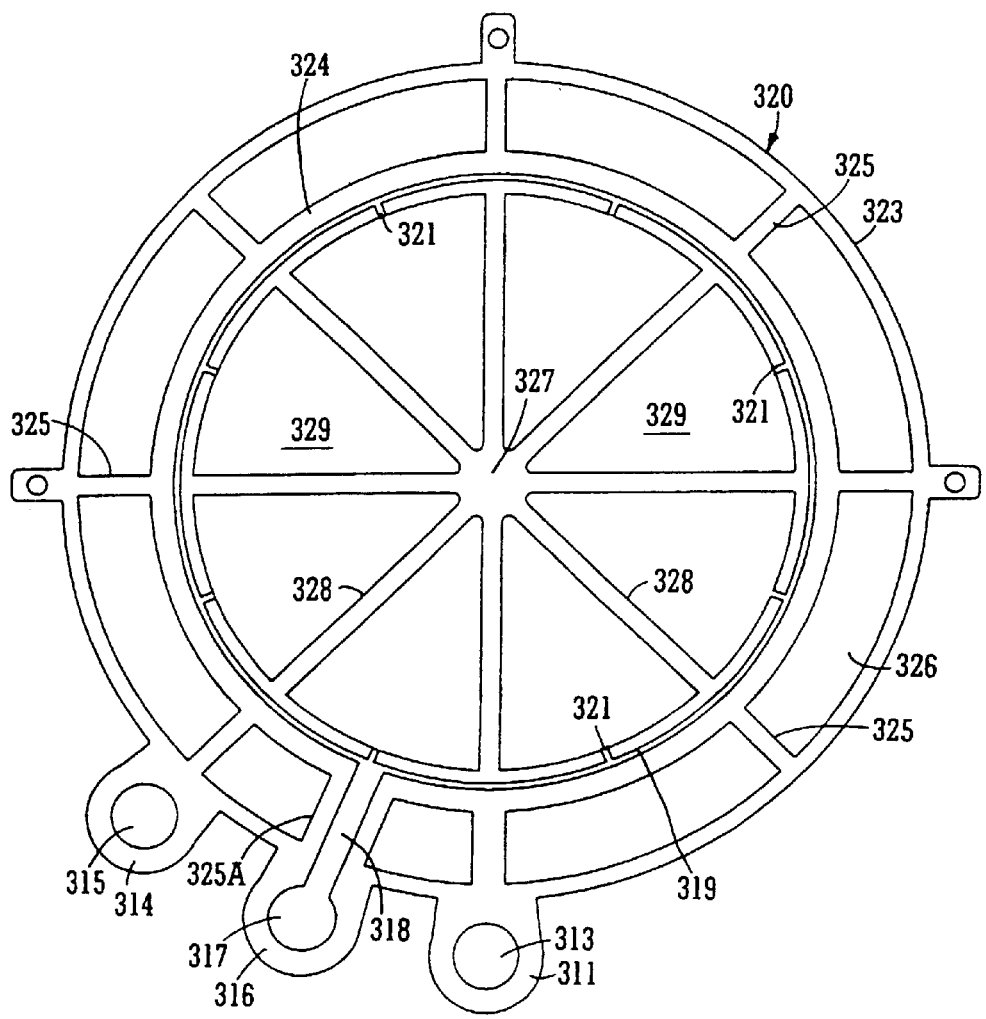
FIG. 24 is a plan view of an injection disc for use in the apparatus of FIG. 20.
Figure 25:
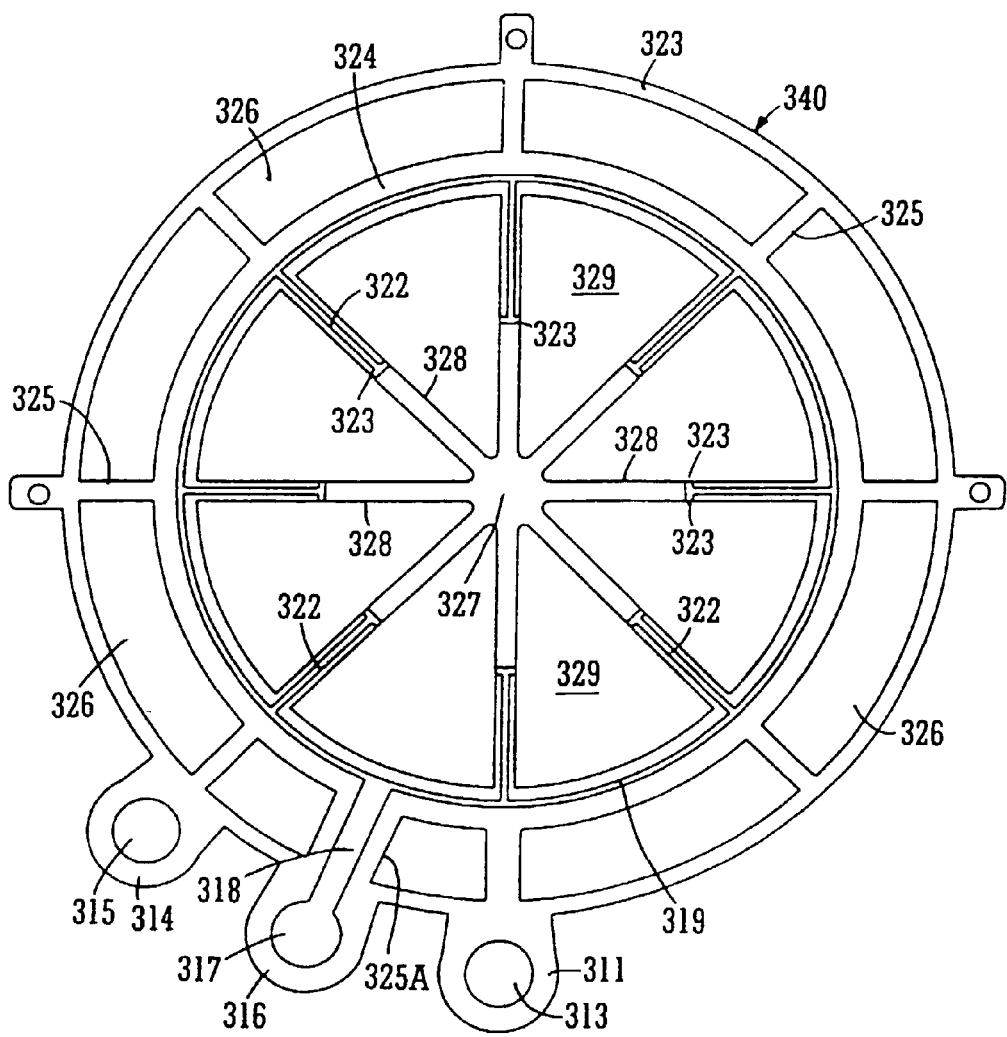
FIG. 25 is a plan view of another injection disc for use in the apparatus of FIG. 20.

Injection plates or discs 320 and 340 as shown in FIGS. 24 and 25 may be positioned between adjacent pairs of discs 290 at various positions in the stack. Plates 320 and 340 may be used alone or a plurality of one type or of both types may be spaced through the stack.

Again the basic structure of the injection plates is the same as for the first and second plates. Plates 320 and 340 each have an outer annulus 323 and an inner annulus 324, a central hub 327, spokes 328, limbs 325, apertures 326 and 329. They have circumferential projections 314 with aperture 315 and 311 with aperture 313 corresponding to 304, 305 and 301, 303 of plate 290. These apertures do not communicate with the other apertures of discs 320 and 340. Between projections 314 and 311, each plate has a projection 316 with an aperture 317. In discs 320 and 340 aperture 317 communicates with inlet 253 (FIG. 20) to provide an injection inlet into the gas flue passages of the plate.

In disc 320 of FIG. 24 aperture 317 communicates through a channel 318 through a thicker limb 325A into a grooved channel 319 extending around inner annulus 324. Radial injection grooves 321 from channel 319 lead into central apertures 329. Injection directly into the flue gas passing through the stack can thereby be made.

In disc 340 of FIG. 25, apertures 317 similarly communicate through a channel 318 through a thicker limb 325A into a grooved channel 319 extending around inner annulus 324. In this instance, channel 319 feeds into grooved channels 322 extending radially from channel 319 along a part of the length of each spoke 328. At their radially inner ends grooved channels 322 feed into central apertures 329 by means of injection grooves 323. Again injection directly into the flue gas can be made at various positions along the stack. The radial position of injection grooves 323 may of course vary along spokes 328.

Figure 26:
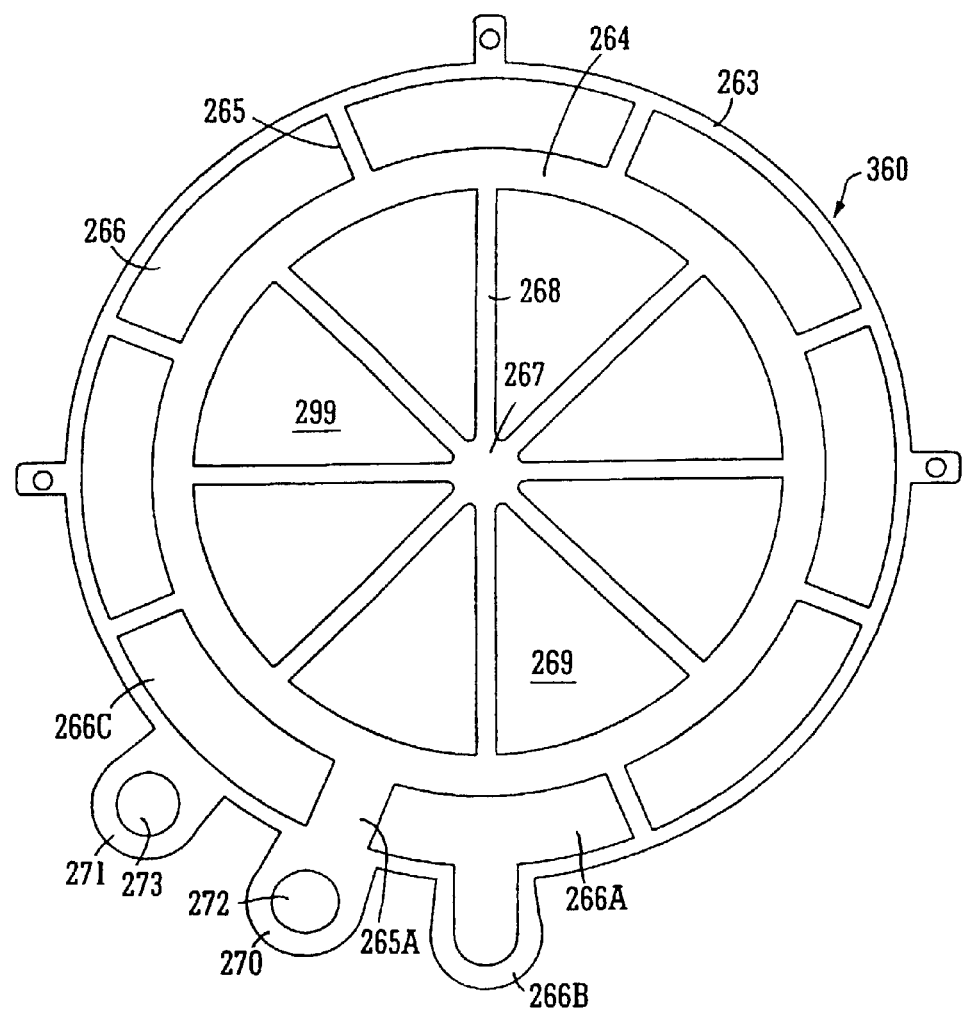
FIG. 26 is a plan view of a third type of second disc for use in the apparatus of FIG. 20.
Figure 27:
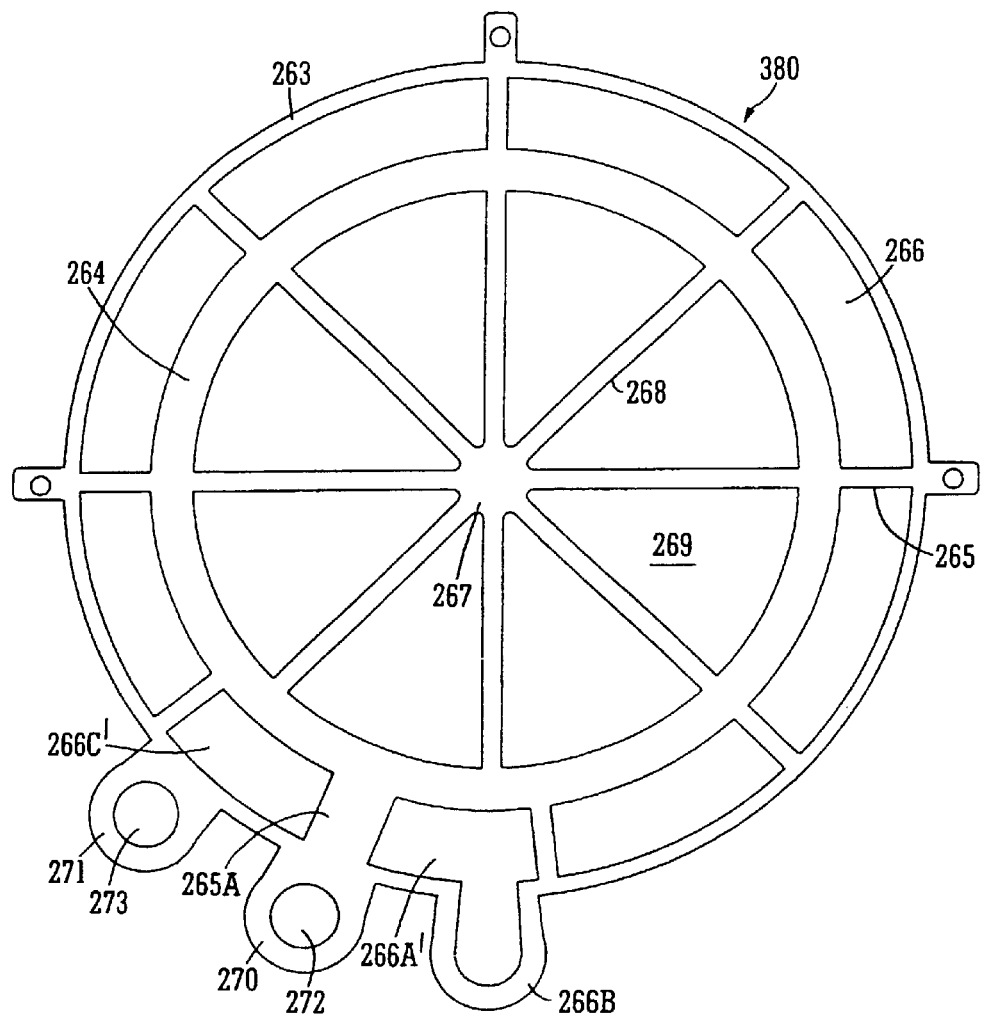
FIG. 27 is a plan view of a fourth type of second disc for use in the apparatus of FIG. 20.

Exit discs 360 and 380 for the coolant are shown in FIGS. 26 and 27 respectively. These are similar to discs 260 and 280 of FIGS. 21 and 22 except that their projections 271 with apertures 272 and their extension loops 266B have been transposed. Loop 266B in discs 360 and 380 provide the coolant outlet indicated at 252 in FIG. 20 and are offset around the stack a little way from coolant inlet 251. Otherwise in FIGS. 26 and 27 like parts are numbered as in FIGS. 21 and 22.

Figure 28:
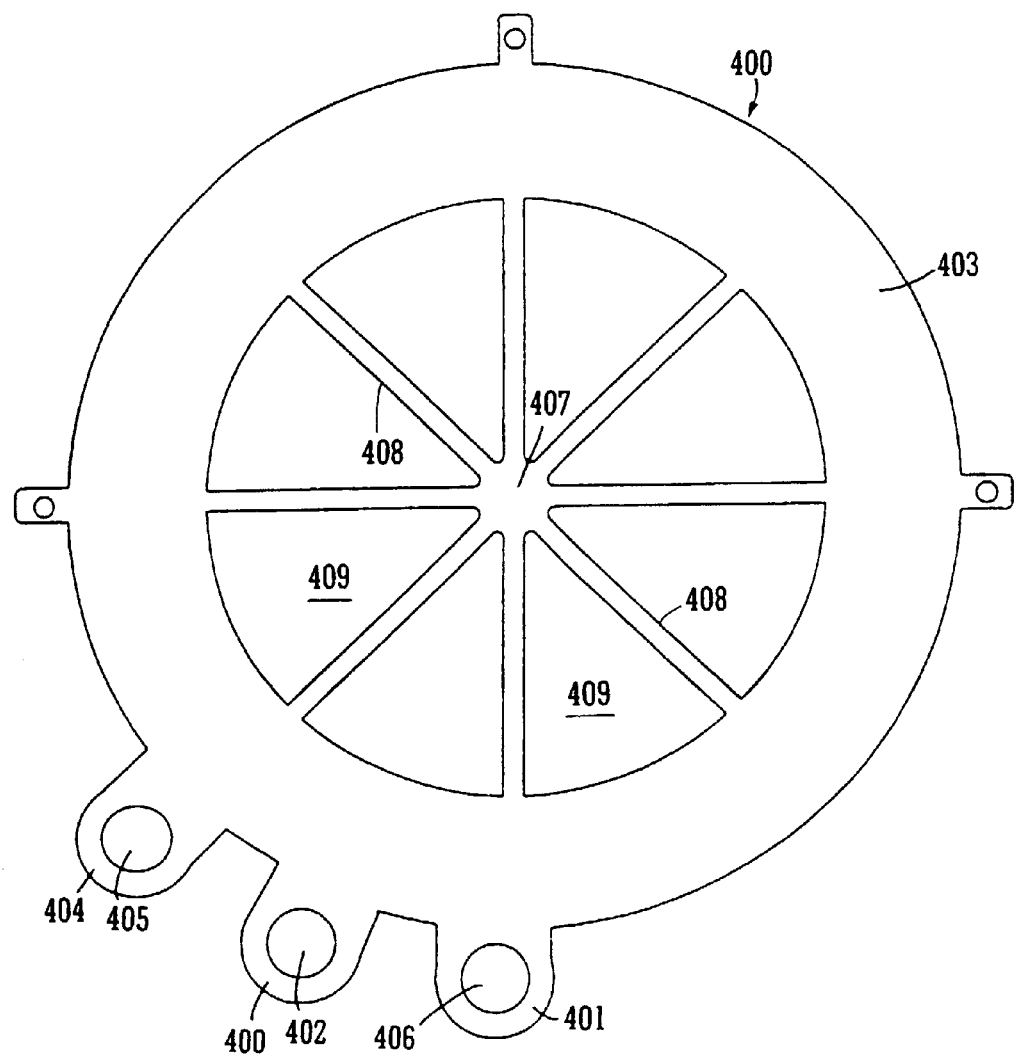
FIG. 28 is a plan view of a third, i.e. end, disc for use in the apparatus of FIG. 20.

In FIG. 28 is shown a third type of disc 400. One such disc will be positioned at the top of the stack of discs of FIG. 20. Disc 400 has a circumferential annulus 403 of sufficient radial extent to cover the inner and outer annuli 263, 264; 293, 294 and 323, 324 of the other discs in the stack. Thus annulus 403 closes the coolant, i.e. second fluid, passageways formed by the alignments of all the coolant apertures in the discs. Another disc 400 will be positioned at the bottom of the stack below disc 260.

The central region of disc 400 has a hub 407 and eight equi-spaced radially-extending spokes 408 between the hub and annulus 403 to define eight apertures 409. Apertures 409 form a continuation in the stack of the flue gas passageways formed by the corresponding apertures in the other discs thereby allowing through flow F, F as indicted in FIG. 20.

Plate 400 has projections 400, 401, 404 with apertures 402, 406, 405 corresponding to projections 300, 301, 304 and apertures 302, 303 and 305 of disc 290. It will be appreciated that the various projections of the discs are aligned in the stack to form feeder tanks on the outside of the stack to feed the coolant inflow, permit the coolant outflow and to feed the injection inflow.

The invention claimed is:

1. A stacked assembly of plates comprising a first portion of the length of the assembly being formed of a plurality of first perforated plates, wherein each first plate is perforated to define a central open region enclosed by an inner annulus and limbs which extend from the outer diameter of the inner annulus to the inner diameter of an outer peripheral annulus, said central open region of each first plate defining a central passageway section for a first fluid inside the inner annulus and a plurality of generally arcuate outer passageway sections for a second fluid defined between the inner and outer annulus and the limbs and, at one end of the first portion, a second portion of the length of the assembly being formed of a plurality of second perforated plates each featuring a central passageway section and generally arcuate outer passageway sections corresponding to the central passageway sections and generally arcuate outer passageway sections of the first plates, the plates of each portion assembling in a stack to provide a continuous central passageway defined by the central passageway sections and continuous generally arcuate outer passageways defined by the generally arcuate outer passageway sections, the generally arcuate outer passageways being connected to an inlet and an outlet for the second fluid and each second plate having an outer peripheral annulus that has one or more discontinuities to provide the inlet or the outlet for the generally arcuate outer passageways for the second fluid and the central passageway being connected to an inlet and outlet for the first fluid.

2. An assembly according to claim 1, including a third portion of its length formed at the other end of the first portion, the plates of the third portion being of the same construction as the plates of the second portion, whereby their discontinuity or discontinuities provide an outlet or an inlet for the outer passageways of the third portion.

3. An assembly according to claim 1, wherein the plates are discs which are circular in plan view.

4. An assembly according to claim 1, whereby the first and second plates are perforated so that their central passageway sections are each formed as a plurality of separate passageway sections.

5. An assembly according to claim 4, wherein the plates are perforated so that each defined a hub at the centre of its central passageway section with a plurality of spokes radiating outwardly from the hub to connect with the inner annulus.

6. An assembly according to claim 5, wherein in some of the plates each spoke corresponds to a limb between the inner and outer annuli so that each limb is in effect a continuation of each spoke.

7. An assembly according to claim 5, wherein the plates have eight equi-spaced spokes and four equi-spaced limbs.

8. An assembly according to claim 5, wherein the limbs are hollow whereby fluid may flow through passageways defined by stacks of the limbs.

9. An assembly according to claim 1, including at one or each end thereof one or more third perforated plates, each third perforated plate having a central open region identical to that of the first plates and a solid annular peripheral region of radial extent to cover the generally arcuate outer passageways of the first plates or second plates.

10. An assembly according to claim 1, wherein all the plates are of the same overall diameter and are from 1 mm to 12 mm in thickness.

11. An assembly according to claim 1, wherein the discontinuities in the second plates are provided by loops in the plate circumference, the loops extending outwardly beyond the perimeter of the peripheral annulus.

12. An assembly according to claim 1, wherein the plates are of clad aluminum or stainless steel and have been brazed or bonded together.

13. An assembly according to claim 1, wherein the perforations in the plates have been produced by high pressure water jet cutting.

14. An assembly according to claim 1, wherein said one or more second perforated plates are provided with discontinuities in its peripheral annulus to provide two or more inlets and/or outlets.

15. An assembly according to claim 14, wherein each outer passageway section of each second plate is provided with an inlet or an outlet discontinuity in the outer peripheral annulus.

16. An assembly according to claim 1, wherein one of the one or more second perforated plates has one or more generally arcuate passageways without an inlet or outlet discontinuity in its outer peripheral annulus and that second plate is positioned in the stack so that its limbs are offset from adjacent discs.

17. An assembly according to claim 5, wherein the hub of each plate is hollow so as to define the central passageway in the stacked assembly.

18. An assembly according to claim 1, including an injection plate, the injection plate having a central hub connected to a solid outer annulus by radial spokes, at least one of the spokes having a radial channel formed by a groove extending inwardly from the outer circumference, the channel being connected to the central passageway for the first fluid in the stack.

19. An assembly according to claim 18, wherein the channel is connected to the central passageway for the first fluid by means of a transverse groove across the spokes.

20. An assembly according to claim 1, including an injection plate, the injection plate having a central hub connected to an inner annulus by radial spokes thereby defining a plurality of central passageways for the first fluid and the inner annulus is joined to an outer peripheral annulus by limbs, an inlet through the outer peripheral annulus leading to a grooved channel extending around the inner annulus and radial grooves from the grooved channel into the central passageways.

21. An assembly according to claim 20, wherein radial grooves lead directly into the central passageways.

22. An assembly according to claim 20, wherein the radial grooves extend from the grooved channel to a position part-way along the radial spokes and then feed into the central passageways via transverse grooves.

23. A stacked assembly of plates according to claim 1, at least one of the passageways containing catalytic material whereby the assembly forms a packed bed catalytic reactor.

24. A heat exchanger comprising a stacked assembly of plates comprising a first portion of the length of the assembly being formed of a plurality of first perforated plates, wherein each first plate is perforated to define a central open region enclosed by an inner annulus and limbs which extend from the outer diameter of the inner annulus to the inner diameter of an outer peripheral annulus, said central open region of each first plate defining a central passageway section for a first fluid inside the inner annulus and a plurality of generally arcuate outer passageway sections for a second fluid defined between the inner and outer annulus and the limbs and, at one end of the first portion, a second portion of the length of the assembly being formed of a plurality of perforated plates each featuring a central passageway section and generally arcuate outer passageway sections corresponding to the central passageway sections and generally arcuate outer passageway sections of the first plates, the plates of each portion assembling in a stack to provide a continuous central passageway defined by the central passageway sections and continuous generally arcuate outer passageways defined by the generally arcuate outer passageway sections, the generally arcuate outer passageways being connected to an inlet and an outlet for the second fluid and each second plate having an outer peripheral annulus that has one or more discontinuities to provide the inlet or the outlet for the generally arcuate outer passageways for the second fluid and the central passageway being connected to an inlet and outlet for the first fluid.

25. A heat exchanger according to claim 24, in which the injector plate is a disc having a solid outer annulus, a hollow central hub, two hollow diametrically opposed spokes and a plurality of solid spokes, the spokes extending from the hub to the outer annulus, a radial groove in the outer annulus providing an inlet to each hollow spoke and a radial groove extending from the innermost end of each hollow spoke into the hollow central hub.

26. A heat exchanger comprising a stacked assembly of plates comprising a first portion of the length of the assembly being formed of a plurality of adjacent first perforated plates, wherein each first plate is perforated to define a central open region enclosed by an inner annulus and limbs which extend from the outer diameter of the inner annulus to the inner diameter of an outer peripheral annulus, said central open region of each first plate defining a central passageway section for a first fluid inside the inner annulus and a plurality of generally arcuate outer passageway sections for a second fluid defined between the inner and outer annulus and the limbs and, at one end of the first portion, a second portion of the length of the assembly being formed of a plurality of adjacent second perforated plates each featuring a central passageway section and generally arcuate outer passageway sections corresponding to the central passageway sections and generally arcuate outer passageway sections of the first plates, the plates of each portion assembling in a stack to provide a continuous central passageway defined by the central passageway sections and continuous generally arcuate outer passageways defined by the generally arcuate outer passageway sections, the generally arcuate outer passageways being connected to an inlet and an outlet for the second fluid and each second plate having an outer peripheral annulus that has one or more discontinuities to provide the inlet or the outlet for the generally arcuate outer passageways for the second fluid and the central passageway being connected to an inlet and outlet for the first fluid.

\* \* \* \* \*